US007608567B2

(12) United States Patent
Saini

(10) Patent No.: US 7,608,567 B2
(45) Date of Patent: Oct. 27, 2009

(54) DEGRADABLE SURFACTANTS AND METHODS FOR USE

(75) Inventor: Rajesh K. Saini, Duncan, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 463 days.

(21) Appl. No.: 11/127,583

(22) Filed: May 12, 2005

(65) Prior Publication Data

US 2006/0258543 A1 Nov. 16, 2006

(51) Int. Cl.
*C09K 8/588* (2006.01)
*E21B 43/00* (2006.01)
*B01F 3/08* (2006.01)

(52) U.S. Cl. .............. 507/221; 166/308.1; 166/308.2; 166/308.6; 507/118; 507/922; 516/18; 516/19; 516/28; 516/30; 516/74; 516/75; 516/76

(58) Field of Classification Search .............. 507/221, 507/118, 922; 166/308.1, 308.2, 308.6; 516/18, 19, 28, 30, 74, 75, 76

See application file for complete search history.

(56) References Cited

U.S. PATENT DOCUMENTS

| 2,238,671 | A | 4/1941 | Woodhouse ............... 166/21 |
| 2,703,316 | A | 3/1955 | Palmer ................. 260/78.3 |
| 3,173,484 | A | 3/1965 | Huitt et al. ............ 166/280.1 |
| 3,195,635 | A | 7/1965 | Fast ................... 166/280.1 |
| 3,272,650 | A | 9/1966 | MacVittie ............... 134/7 |
| 3,302,719 | A | 2/1967 | Fischer ................ 166/280.2 |
| 3,364,995 | A | 1/1968 | Atkins et al. .......... 166/280.1 |
| 3,366,178 | A | 1/1968 | Malone et al. ......... 166/280.1 |
| 3,455,390 | A | 7/1969 | Gallus ................... 166/295 |
| 3,784,585 | A | 1/1974 | Schmitt et al. ........... 260/861 |
| 3,819,525 | A | 6/1974 | Hattenbrun .............. 252/132 |
| 3,828,854 | A | 8/1974 | Templeton et al. ......... 166/307 |
| 3,836,465 | A | 9/1974 | Rhudy et al. |
| 3,868,998 | A | 3/1975 | Lybarger et al. .......... 166/278 |
| 3,912,692 | A | 10/1975 | Casey et al. ............ 260/78.3 |
| 3,948,672 | A | 4/1976 | Harnsberger ............. 106/90 |
| 3,955,993 | A | 5/1976 | Curtice ................. 106/90 |
| 3,960,736 | A | 6/1976 | Free et al. ............. 252/8.55 |
| 3,968,840 | A | 7/1976 | Tate ................... 166/280.1 |
| 3,986,355 | A | 10/1976 | Klaeger |
| 3,998,272 | A | 12/1976 | Maly ................... 166/281 |
| 3,998,744 | A | 12/1976 | Arnold et al. ............ 507/269 |
| 4,062,814 | A | 12/1977 | Hansen ................. 252/529 |
| 4,068,718 | A | 1/1978 | Cooke, Jr. et al. ........ 166/280.2 |
| 4,169,798 | A | 10/1979 | DeMartino ........... 252/8.55 R |
| 4,172,066 | A | 10/1979 | Zweigle et al. ....... 260/29.6 TA |
| 4,206,074 | A | 6/1980 | Perner ................. 252/351 |
| 4,261,421 | A | 4/1981 | Watanabe |
| 4,360,451 | A | 11/1982 | Schmolka .............. 252/316 |
| 4,387,769 | A | 6/1983 | Erbstoesser et al. ........ 166/295 |
| 4,460,052 | A | 7/1984 | Gockel ................. 175/72 |
| 4,464,203 | A | 8/1984 | Belde et al. ............. 106/308 |
| 4,470,915 | A | 9/1984 | Conway ............... 252/8.55 R |
| 4,476,107 | A | 10/1984 | Schmolka .............. 424/49 |
| 4,498,995 | A | 2/1985 | Gockel ................ 252/8.5 LC |
| 4,506,734 | A | 3/1985 | Nolte |
| 4,521,316 | A | 6/1985 | Sikorski |
| 4,526,695 | A | 7/1985 | Erbstoesser et al. ..... 252/8.55 R |
| 4,595,513 | A | 6/1986 | Morgenthaler et al. ..... 252/8.55 |
| 4,632,876 | A | 12/1986 | Laird et al. |
| 4,634,039 | A | 1/1987 | Banerjee ................ 228/118 |
| 4,668,430 | A | 5/1987 | Schmolka .............. 252/522 |
| 4,683,953 | A | 8/1987 | Eustace et al. |
| 4,694,905 | A | 9/1987 | Armbruster .............. 166/280 |
| 4,715,967 | A | 12/1987 | Bellis ................. 252/8.551 |
| 4,716,964 | A | 1/1988 | Erbstoesser et al. ........ 166/284 |
| 4,745,160 | A | 5/1988 | Churchill et al. ........... 525/415 |
| 4,767,706 | A | 8/1988 | Levesque |
| 4,772,346 | A | 9/1988 | Anderson et al. |
| 4,785,884 | A | 11/1988 | Armbruster .............. 166/280 |
| 4,793,416 | A | 12/1988 | Mitchell |
| 4,797,262 | A | 1/1989 | Dewitz ................. 422/142 |
| 4,809,783 | A | 3/1989 | Hollenbeck et al. ........ 166/307 |
| 4,817,721 | A | 4/1989 | Pober .................. 166/295 |
| 4,822,500 | A | 4/1989 | Dobson, Jr. et al. |
| 4,829,100 | A | 5/1989 | Murphey et al. |

(Continued)

FOREIGN PATENT DOCUMENTS

EP 0338396 A2 4/1989

(Continued)

OTHER PUBLICATIONS

Kiyoshi Matsuyama et al, Environmentally benign formation of polymeric microspheres by rapid expansion of supercritical carbon dioxide solution with a nonsolvent, Environ Sci Technol 2001, 35, 4149-4155.

(Continued)

*Primary Examiner*—Timothy J. Kugel
(74) *Attorney, Agent, or Firm*—Robert A. Kent; Baker Botts LLP

(57) ABSTRACT

The present invention relates to methods for treating subterranean formations. A method, that comprises providing a treatment fluid that comprises an aqueous fluid, and a degradable surfactant derived from a degradable polymer; and introducing the treatment fluid into a well bore that penetrates the subterranean formation, is provided.

25 Claims, No Drawings

U.S. PATENT DOCUMENTS

| | | | |
|---|---|---|---|
| 4,836,940 A | 6/1989 | Alexander | |
| 4,843,118 A | 6/1989 | Lai et al. | 524/555 |
| 4,848,467 A | 7/1989 | Cantu et al. | 166/281 |
| 4,886,354 A | 12/1989 | Welch et al. | 356/70 |
| 4,894,231 A | 1/1990 | Moreau et al. | |
| 4,904,466 A | 2/1990 | Carson et al. | 424/76.3 |
| 4,957,165 A | 9/1990 | Cantu et al. | 166/295 |
| 4,961,466 A | 10/1990 | Himes et al. | 166/250 |
| 4,986,353 A | 1/1991 | Clark et al. | 166/279 |
| 4,986,354 A | 1/1991 | Cantu et al. | 166/279 |
| 4,986,355 A | 1/1991 | Casad et al. | 166/295 |
| 5,034,139 A | 7/1991 | Reid et al. | |
| 5,082,056 A | 1/1992 | Tackett, Jr. | 166/295 |
| 5,142,023 A | 8/1992 | Gruber et al. | 528/354 |
| 5,152,781 A | 10/1992 | Tang et al. | |
| 5,152,933 A | 10/1992 | Holland | 252/559 |
| 5,161,615 A | 11/1992 | Hutchins et al. | |
| 5,216,050 A | 6/1993 | Sinclair | 524/108 |
| 5,247,059 A | 9/1993 | Gruber et al. | 528/354 |
| 5,249,628 A | 10/1993 | Surjaatmadja | 166/305 |
| 5,295,542 A | 3/1994 | Cole et al. | 166/278 |
| 5,304,620 A | 4/1994 | Holtmyer et al. | |
| 5,320,647 A | 6/1994 | Henning et al. | 8/437 |
| 5,324,354 A | 6/1994 | Jesse et al. | 106/413 |
| 5,325,923 A | 7/1994 | Surjaatmadja et al. | 166/308 |
| 5,330,005 A | 7/1994 | Card et al. | 166/280 |
| 5,342,550 A | 8/1994 | Burke et al. | 252/548 |
| 5,359,026 A | 10/1994 | Gruber | 528/354 |
| 5,360,068 A | 11/1994 | Sprunt et al. | 166/259 |
| 5,363,916 A | 11/1994 | Himes et al. | 166/276 |
| 5,373,901 A | 12/1994 | Norman et al. | 166/300 |
| 5,386,874 A | 2/1995 | Laramay et al. | 166/300 |
| 5,396,957 A | 3/1995 | Surjaatmadja et al. | 166/308 |
| 5,402,846 A | 4/1995 | Jennings, Jr. et al. | 166/259 |
| 5,429,826 A | 7/1995 | Nair et al. | 424/501 |
| 5,439,055 A | 8/1995 | Card et al. | 166/280 |
| 5,460,226 A | 10/1995 | Lawson et al. | 166/300 |
| 5,464,060 A | 11/1995 | Hale et al. | 166/293 |
| 5,466,762 A | 11/1995 | Kroner et al. | 525/472 |
| 5,470,510 A | 11/1995 | Willey et al. | 252/546 |
| 5,475,080 A | 12/1995 | Gruber et al. | 528/354 |
| 5,484,881 A | 1/1996 | Gruber et al. | 528/354 |
| 5,487,897 A | 1/1996 | Polson et al. | |
| 5,496,557 A | 3/1996 | Feijen et al. | |
| 5,497,830 A | 3/1996 | Boles et al. | 166/300 |
| 5,499,678 A | 3/1996 | Surjaatmadja et al. | 166/298 |
| 5,505,787 A | 4/1996 | Yamaguchi | 134/4 |
| 5,512,071 A | 4/1996 | Yam et al. | 51/307 |
| 5,516,452 A | 5/1996 | Welch et al. | 252/174.22 |
| 5,518,648 A | 5/1996 | Welch et al. | 252/174.22 |
| 5,525,657 A | 6/1996 | Anchor et al. | 524/261 |
| 5,525,702 A | 6/1996 | Nace | 528/354 |
| 5,536,807 A | 7/1996 | Gruber et al. | 528/354 |
| 5,555,936 A | 9/1996 | Pirri et al. | |
| 5,591,700 A | 1/1997 | Harris et al. | 507/204 |
| 5,594,095 A | 1/1997 | Gruber et al. | 528/354 |
| 5,604,186 A | 2/1997 | Hunt et al. | 507/204 |
| 5,607,905 A | 3/1997 | Dobson, Jr. et al. | 507/211 |
| 5,670,473 A | 9/1997 | Scepanski | 510/445 |
| 5,695,813 A | 12/1997 | Anchor et al. | 427/180 |
| 5,697,440 A | 12/1997 | Weaver et al. | |
| 5,698,322 A | 12/1997 | Tsai et al. | 428/373 |
| 5,765,642 A | 6/1998 | Surjaatmadja | 166/297 |
| 5,783,527 A | 7/1998 | Dobson, Jr. et al. | |
| 5,791,415 A | 8/1998 | Nguyen et al. | 166/280 |
| 5,833,000 A | 11/1998 | Weaver et al. | 166/276 |
| 5,837,098 A | 11/1998 | Li et al. | 162/5 |
| 5,849,401 A | 12/1998 | El-Afandi et al. | 428/215 |
| 5,853,048 A | 12/1998 | Weaver et al. | 166/279 |
| 5,893,416 A | 4/1999 | Read | 166/304 |
| 5,908,073 A | 6/1999 | Nguyen et al. | 166/276 |
| 5,919,434 A | 7/1999 | Dugstad et al. | 424/9.52 |
| 5,924,488 A | 7/1999 | Nguyen et al. | 166/280 |
| 5,964,291 A | 10/1999 | Bourne et al. | 166/279 |
| 5,965,509 A | 10/1999 | Welch et al. | 510/365 |
| 5,979,557 A | 11/1999 | Card et al. | |
| 6,004,400 A | 12/1999 | Bishop et al. | 134/2 |
| 6,024,170 A | 2/2000 | McCabe et al. | 166/300 |
| 6,028,113 A | 2/2000 | Scepanski | 514/643 |
| 6,047,772 A | 4/2000 | Weaver et al. | 166/276 |
| 6,114,410 A | 9/2000 | Betzold | 523/130 |
| 6,123,965 A | 9/2000 | Jacob et al. | 424/489 |
| 6,131,661 A | 10/2000 | Conner et al. | 166/300 |
| 6,133,218 A | 10/2000 | Kerobo et al. | 510/365 |
| 6,135,987 A | 10/2000 | Tsai et al. | 604/365 |
| 6,143,698 A | 11/2000 | Murphey et al. | 507/145 |
| 6,162,766 A | 12/2000 | Muir et al. | 507/267 |
| 6,166,151 A | 12/2000 | Hariharan et al. | 525/463 |
| 6,169,058 B1 | 1/2001 | Le et al. | 507/222 |
| 6,172,011 B1 | 1/2001 | Card et al. | 507/204 |
| 6,189,615 B1 | 2/2001 | Sydansk | 166/270 |
| 6,202,751 B1 | 3/2001 | Chatterji et al. | 166/276 |
| 6,209,643 B1 | 4/2001 | Nguyen et al. | 166/276 |
| 6,209,646 B1 | 4/2001 | Reddy et al. | 166/300 |
| 6,214,773 B1 | 4/2001 | Harris et al. | |
| 6,242,390 B1 | 6/2001 | Mitchell et al. | 507/211 |
| 6,260,622 B1 | 7/2001 | Blok et al. | 166/305.1 |
| 6,279,656 B1 * | 8/2001 | Sinclair et al. | 166/310 |
| 6,291,013 B1 | 9/2001 | Gibson et al. | |
| 6,291,077 B1 | 9/2001 | Hariharan et al. | 428/480 |
| 6,300,286 B1 | 10/2001 | Dobson, Jr. et al. | |
| 6,308,788 B1 | 10/2001 | Patel et al. | |
| 6,311,773 B1 | 11/2001 | Todd et al. | 166/280 |
| 6,322,722 B1 | 11/2001 | Bhattacharjee et al. | 252/182.24 |
| 6,323,307 B1 | 11/2001 | Bigg et al. | 528/354 |
| 6,326,458 B1 | 12/2001 | Gruber et al. | 528/354 |
| 6,328,105 B1 | 12/2001 | Betzold | 166/280 |
| 6,357,527 B1 | 3/2002 | Norman et al. | 166/300 |
| 6,364,945 B1 | 4/2002 | Chatterji et al. | 106/677 |
| 6,380,138 B1 | 4/2002 | Ischy et al. | 507/204 |
| 6,387,986 B1 | 5/2002 | Moradi-Araghi et al. | 523/211 |
| 6,390,195 B1 | 5/2002 | Nguyen et al. | 166/276 |
| 6,394,185 B1 | 5/2002 | Constien | 166/296 |
| 6,414,170 B1 | 7/2002 | Kim et al. | 554/52 |
| 6,422,314 B1 | 7/2002 | Todd et al. | 166/312 |
| 6,440,919 B1 | 8/2002 | Kerobo et al. | 510/365 |
| 6,451,346 B1 | 9/2002 | Shah et al. | 424/486 |
| 6,454,003 B1 | 9/2002 | Chang et al. | 166/270 |
| 6,469,132 B1 | 10/2002 | Eisenberg et al. | 528/354 |
| 6,485,947 B1 | 11/2002 | Rajgarhia et al. | 435/139 |
| 6,488,763 B2 | 12/2002 | Brothers et al. | 106/692 |
| 6,494,263 B2 | 12/2002 | Todd | 166/312 |
| 6,508,305 B1 | 1/2003 | Brannon et al. | 166/293 |
| 6,509,301 B1 | 1/2003 | Vollmer et al. | |
| 6,527,051 B1 | 3/2003 | Reddy et al. | 166/300 |
| 6,541,033 B1 | 4/2003 | Shah | 424/486 |
| 6,554,071 B1 | 4/2003 | Reddy et al. | 166/293 |
| 6,562,897 B1 | 5/2003 | Thetford | 524/547 |
| 6,569,814 B1 | 5/2003 | Brady et al. | 507/201 |
| 6,599,863 B1 | 7/2003 | Palmer et al. | 507/219 |
| 6,632,457 B1 | 10/2003 | Sawhney | 424/501 |
| 6,653,395 B1 | 11/2003 | Bergstrom et al. | 524/599 |
| 6,667,279 B1 | 12/2003 | Hessert et al. | 507/225 |
| 6,669,771 B2 | 12/2003 | Tokiwa et al. | 106/162.7 |
| 6,681,856 B1 | 1/2004 | Chatterji et al. | 166/294 |
| 6,686,328 B1 | 2/2004 | Binder | 510/446 |
| 6,691,780 B2 | 2/2004 | Nguyen et al. | |
| 6,702,023 B1 | 3/2004 | Harris et al. | 166/307 |
| 6,710,019 B1 | 3/2004 | Sawdon et al. | 507/136 |
| 6,737,385 B2 | 5/2004 | Todd et al. | |
| 6,761,218 B2 | 7/2004 | Nguyen et al. | 166/278 |
| 6,763,888 B1 | 7/2004 | Harris et al. | 166/305.1 |
| 6,793,018 B2 | 9/2004 | Dawson et al. | |
| 6,817,414 B2 | 11/2004 | Lee | 166/278 |

| Patent/Publication | Date | Inventor(s) | Class |
|---|---|---|---|
| 6,837,309 B2 | 1/2005 | Boney et al. | 166/280.2 |
| 6,896,058 B2 | 5/2005 | Munoz, Jr. et al. | 166/279 |
| 6,949,491 B2 | 9/2005 | Cooke, Jr. | 507/219 |
| 6,978,838 B2 | 12/2005 | Parlar et al. | |
| 6,997,259 B2 | 2/2006 | Nguyen | |
| 7,021,377 B2 | 4/2006 | Todd et al. | |
| 7,032,663 B2 | 4/2006 | Nguyen | |
| 7,036,586 B2 | 5/2006 | Roddy et al. | |
| 7,036,587 B2 | 5/2006 | Munoz, Jr. et al. | |
| 7,044,220 B2 | 5/2006 | Nguyen et al. | |
| 7,044,224 B2 | 5/2006 | Nguyen | |
| 7,063,151 B2 | 6/2006 | Nguyen et al. | |
| 7,066,258 B2 | 6/2006 | Justus et al. | |
| 7,069,994 B2 | 7/2006 | Cooke, Jr. | |
| 7,080,688 B2 | 7/2006 | Todd et al. | 166/278 |
| 7,093,664 B2 | 8/2006 | Todd et al. | |
| 7,096,947 B2 | 8/2006 | Todd et al. | |
| 7,131,491 B2 | 11/2006 | Blauch et al. | |
| 7,140,438 B2 | 11/2006 | Frost et al. | |
| 7,151,077 B2 | 12/2006 | Prud'homme et al. | |
| 7,156,174 B2 | 1/2007 | Roddy et al. | |
| 7,165,617 B2 | 1/2007 | Lord et al. | |
| 7,168,489 B2 | 1/2007 | Frost et al. | |
| 7,172,022 B2 | 2/2007 | Reddy et al. | |
| 7,178,596 B2 | 2/2007 | Blauch et al. | 166/280 |
| 7,195,068 B2 | 3/2007 | Todd | |
| 7,204,312 B2 | 4/2007 | Roddy et al. | |
| 7,219,731 B2 | 5/2007 | Sullivan et al. | 166/278 |
| 7,228,904 B2 | 6/2007 | Todd et al. | |
| 7,261,156 B2 | 8/2007 | Nguyen et al. | |
| 7,264,051 B2 | 9/2007 | Nguyen et al. | |
| 7,267,170 B2 | 9/2007 | Mang et al. | |
| 7,299,876 B2 | 11/2007 | Lord et al. | |
| 7,306,037 B2 | 12/2007 | Nguyen et al. | |
| 7,353,876 B2 | 4/2008 | Savery et al. | |
| 7,353,879 B2 | 4/2008 | Todd et al. | |
| 7,413,017 B2 | 8/2008 | Nguyen et al. | |
| 7,448,450 B2 | 11/2008 | Luke et al. | |
| 7,455,112 B2 | 11/2008 | Moorehead et al. | |
| 7,461,697 B2 | 12/2008 | Todd et al. | |
| 7,475,728 B2 | 1/2009 | Pauls et al. | |
| 7,484,564 B2 | 2/2009 | Welton et al. | |
| 7,497,258 B2 | 3/2009 | Savery et al. | |
| 7,497,278 B2 | 3/2009 | Schriener et al. | |
| 7,506,689 B2 | 3/2009 | Surjaatmadja et al. | |
| 2001/0016562 A1 | 8/2001 | Muir et al. | 507/201 |
| 2002/0036088 A1 | 3/2002 | Todd | 166/300 |
| 2002/0119169 A1 | 8/2002 | Angel et al. | |
| 2002/0125012 A1 | 9/2002 | Dawson et al. | 166/300 |
| 2002/0161134 A1 | 10/2002 | Kim et al. | 525/408 |
| 2002/0169274 A1 | 11/2002 | Eisenberg et al. | 528/354 |
| 2003/0054962 A1 | 3/2003 | England et al. | |
| 2003/0060374 A1 | 3/2003 | Cooke, Jr. | 507/200 |
| 2003/0099709 A1 | 5/2003 | Shah et al. | 424/469 |
| 2003/0114314 A1 | 6/2003 | Ballard et al. | 507/100 |
| 2003/0119678 A1* | 6/2003 | Crews | 507/100 |
| 2003/0130133 A1 | 7/2003 | Vollmer | 507/100 |
| 2003/0147965 A1 | 8/2003 | Bassett et al. | |
| 2003/0188766 A1 | 10/2003 | Banerjee et al. | 134/7 |
| 2003/0204012 A1 | 10/2003 | Thetford | 524/547 |
| 2003/0230407 A1 | 12/2003 | Vijn et al. | |
| 2003/0234103 A1 | 12/2003 | Lee et al. | 166/293 |
| 2004/0014606 A1 | 1/2004 | Parlar et al. | |
| 2004/0014607 A1 | 1/2004 | Sinclair et al. | 507/200 |
| 2004/0040706 A1 | 3/2004 | Hossaini et al. | 166/278 |
| 2004/0055747 A1 | 3/2004 | Lee | 166/278 |
| 2004/0070093 A1 | 4/2004 | Mathiowitz et al. | |
| 2004/0094300 A1 | 5/2004 | Sullivan et al. | 166/308.1 |
| 2004/0094301 A1 | 5/2004 | Hughes et al. | |
| 2004/0099416 A1 | 5/2004 | Vijn et al. | |
| 2004/0106525 A1 | 6/2004 | Willbert et al. | 507/200 |
| 2004/0138068 A1 | 7/2004 | Rimmer et al. | 507/100 |
| 2004/0152601 A1 | 8/2004 | Still et al. | 507/100 |
| 2004/0152602 A1 | 8/2004 | Boles | 507/100 |
| 2004/0162386 A1 | 8/2004 | Altes et al. | |
| 2004/0170836 A1 | 9/2004 | Bond et al. | |
| 2004/0214724 A1 | 10/2004 | Todd et al. | |
| 2004/0216876 A1 | 11/2004 | Lee | 166/280.1 |
| 2004/0231845 A1 | 11/2004 | Cooke, Jr. | 166/279 |
| 2004/0261993 A1 | 12/2004 | Nguyen | 166/276 |
| 2004/0261995 A1 | 12/2004 | Nguyen et al. | 166/279 |
| 2004/0261996 A1 | 12/2004 | Munoz, Jr. et al. | 166/279 |
| 2004/0261999 A1 | 12/2004 | Nguyen | 166/292 |
| 2005/0006095 A1 | 1/2005 | Justus et al. | 166/295 |
| 2005/0028976 A1 | 2/2005 | Nguyen | 166/276 |
| 2005/0034861 A1 | 2/2005 | Saini et al. | 166/278 |
| 2005/0034865 A1 | 2/2005 | Todd et al. | 166/304 |
| 2005/0034868 A1 | 2/2005 | Frost et al. | 166/307 |
| 2005/0045328 A1 | 3/2005 | Frost et al. | 166/278 |
| 2005/0051330 A1 | 3/2005 | Nguyen | 166/276 |
| 2005/0056423 A1 | 3/2005 | Todd et al. | 166/278 |
| 2005/0059556 A1 | 3/2005 | Munoz, Jr. et al. | 507/103 |
| 2005/0059557 A1 | 3/2005 | Todd et al. | 507/110 |
| 2005/0059558 A1 | 3/2005 | Blauch et al. | 507/203 |
| 2005/0103496 A1 | 5/2005 | Todd et al. | 166/278 |
| 2005/0126785 A1 | 6/2005 | Todd | 166/307 |
| 2005/0130848 A1 | 6/2005 | Todd et al. | |
| 2005/0183741 A1 | 8/2005 | Surjaatmadja et al. | |
| 2005/0205266 A1 | 9/2005 | Todd et al. | |
| 2005/0252659 A1 | 11/2005 | Sullivan et al. | 166/280.1 |
| 2005/0272613 A1 | 12/2005 | Cooke, Jr. | 507/219 |
| 2005/0277554 A1 | 12/2005 | Blauch et al. | |
| 2006/0016596 A1 | 1/2006 | Pauls et al. | |
| 2006/0032633 A1 | 2/2006 | Nguyen | |
| 2006/0046938 A1 | 3/2006 | Harris et al. | |
| 2006/0048938 A1 | 3/2006 | Kalman | |
| 2006/0065397 A1 | 3/2006 | Nguyen et al. | |
| 2006/0105917 A1 | 5/2006 | Munoz, Jr. | 507/103 |
| 2006/0105918 A1 | 5/2006 | Munoz, Jr. et al. | |
| 2006/0169182 A1 | 8/2006 | Todd et al. | |
| 2006/0169448 A1 | 8/2006 | Savery et al. | |
| 2006/0169450 A1 | 8/2006 | Mang et al. | |
| 2006/0169452 A1 | 8/2006 | Savery et al. | |
| 2006/0169453 A1 | 8/2006 | Savery et al. | |
| 2006/0172893 A1 | 8/2006 | Todd et al. | |
| 2006/0172894 A1 | 8/2006 | Mang et al. | |
| 2006/0172895 A1 | 8/2006 | Mang et al. | |
| 2006/0185847 A1 | 8/2006 | Saini et al. | |
| 2006/0185848 A1 | 8/2006 | Surjaatmadja et al. | |
| 2006/0205608 A1 | 9/2006 | Todd | |
| 2006/0243449 A1 | 11/2006 | Welton et al. | |
| 2006/0247135 A1 | 11/2006 | Welton et al. | |
| 2006/0254774 A1 | 11/2006 | Saini et al. | |
| 2006/0258543 A1 | 11/2006 | Saini | |
| 2006/0258544 A1 | 11/2006 | Saini | |
| 2006/0276345 A1 | 12/2006 | Todd et al. | |
| 2006/0283597 A1 | 12/2006 | Schriener et al. | 166/300 |
| 2007/0042912 A1 | 2/2007 | Welton et al. | |
| 2007/0049501 A1 | 3/2007 | Saini et al. | |
| 2007/0066492 A1 | 3/2007 | Funkhouser et al. | |
| 2007/0066493 A1 | 3/2007 | Funkhouser et al. | |
| 2007/0078063 A1 | 4/2007 | Munoz, Jr. | |
| 2007/0078064 A1 | 4/2007 | Munoz et al. | |
| 2007/0235190 A1 | 10/2007 | Lord et al. | |
| 2007/0238623 A1 | 10/2007 | Saini et al. | |
| 2007/0281868 A1 | 12/2007 | Pauls et al. | |
| 2008/0026955 A1 | 1/2008 | Munoz et al. | |
| 2008/0026959 A1 | 1/2008 | Munoz et al. | |
| 2008/0026960 A1 | 1/2008 | Munoz et al. | |
| 2008/0027157 A1 | 1/2008 | Munoz et al. | |
| 2008/0070810 A1 | 3/2008 | Mang | |
| 2008/0139415 A1 | 6/2008 | Todd et al. | |
| 2008/0169102 A1 | 7/2008 | Carbajal et al. | |

| | | |
|---|---|---|
| 2009/0062157 A1 | 3/2009 | Munoz et al. |

FOREIGN PATENT DOCUMENTS

| | | |
|---|---|---|
| EP | 0 510 762 A2 | 10/1992 |
| EP | 0720511 B1 | 9/1994 |
| EP | 0687720 A2 | 6/1995 |
| EP | 0687720 A3 | 6/1995 |
| EP | 0707041 A1 | 10/1995 |
| EP | 0747072 B1 | 5/1996 |
| EP | 0 879 935 A2 | 11/1998 |
| EP | 0 879 935 A3 | 2/1999 |
| EP | 1 413 710 A1 | 4/2004 |
| GB | 2 412 389 | 3/2004 |
| JP | 10292022 | 4/1997 |
| JP | 2004181820 A | 7/2004 |
| WO | WO 93/15127 A1 | 8/1993 |
| WO | WO 94/07949 A1 | 4/1994 |
| WO | WO 94/08078 A1 | 4/1994 |
| WO | WO 94/08090 A1 | 4/1994 |
| WO | WO95/08389 | 3/1995 |
| WO | WO 95/09879 A1 | 4/1995 |
| WO | WO 97/11845 A1 | 4/1997 |
| WO | WO98/27132 | 6/1998 |
| WO | WO 99/27229 | 6/1999 |
| WO | WO99/55762 | 11/1999 |
| WO | WO 00/57022 | 9/2000 |
| WO | WO 01/02698 | 1/2001 |
| WO | WO01/41735 | 7/2001 |
| WO | WO 01/87797 A1 | 11/2001 |
| WO | WO 01/94744 | 12/2001 |
| WO | WO 03/056130 A1 | 12/2001 |
| WO | WO 02/55843 A1 | 1/2002 |
| WO | WO 02/12674 A1 | 2/2002 |
| WO | WO02/46268 | 6/2002 |
| WO | WO02/070861 | 9/2002 |
| WO | WO03/000766 | 1/2003 |
| WO | WO 03/027431 A2 | 4/2003 |
| WO | WO 03/027431 A3 | 4/2003 |
| WO | WO03/033592 | 4/2003 |
| WO | WO03/033593 | 4/2003 |
| WO | WO03/054120 | 7/2003 |
| WO | WO03/087189 | 10/2003 |
| WO | WO03/095597 | 11/2003 |
| WO | WO 2004/007905 | 1/2004 |
| WO | WO 2004/037946 A1 | 5/2004 |
| WO | WO 2004/038176 A1 | 5/2004 |

OTHER PUBLICATIONS

Hoffmann et al.; "Flow Birefringence and Rheological Measurements on Viscoelastic Detergent Solutions"; Lehrstuhl fur Physikalische Chemie der Universitat Bayreuth 30, pp. 237-250, May 1997.

Saul, Dorothy et al.; "Phase Structure and Rheological Properties of a Mixed Switterionic/Anionic Surfactant System"; J. Chem. Soc. Faraday Transactions 2, 70; pp. 163-170, Jul. 1973.

R. Dimova et al.; "Hyperviscous diblock copolymer vesicles"; The European Physical Journal E; 241-250, 2002.

N. Kumar, et al.; "Biodegradable block copolymers"; Advanced Drug Delivery Reviews; 53; pp. 23-44, 2001.

W.E. Hennink et al.; "Novel crosslinking methods to design hydrogels"; Advanced Drug Delivery Reviews; 54; pp. 13-36, 2002.

Dennis Discher et al.; "Polymer Vesicles"; Science, vol. 297, Aug. 9, 2002.

San Yeob Park; et al.; Micellization and Gelation of Aqueous Solutions of Star-Shaped PLLA-PEO Block Copolymers; Center for Advanced Functional Polymers; Korea Advanced Institute of Science and Technology; Macramolecules, 36, 4115-4124, 2003.

Fenghua Meng, et al.; "Biodegradable Polymersomes"; Macromolecules, 36, 3004-3006, 2003.

Hoffman, H. et al.; "Influence of Ionic Surfactants on the Viscoelastic Properties of Zwitterionic Surfactant Solutions", Langmuir; vol. 8, pp. 2140-2146, 1992.

Black, Fiona E. et al.; "Surface engineering and surface analysis of a biodegradable polymer with biotinylated end groups"; Langmuir; vol. 15, No. 9; pp. 3157-3161, 1999.

Ma, J. et al.; Improved interfacial Coacervation Technique to Fabricate Biodegradable Nanocapsules of an Aqueous Peptide Solution from Polylactide and its Block Copolymers with Poly(Ethylene Glycol); Colloid & Polymer Science, 279, No. 4, p. 387-92, Apr. 2001.

Marchessault, R.H. et al.; "Preparation and Characterisation of Low Molecular Weight Poly(3-Hydroxybutyrate)s and their Block Copolymers with Polyoxyethylene"; Polymer Preprints; vol. 40, No. 1, p. 527-8, 1999.

Anderson, B.C. et al.; "Understanding drug release from poly(ethylene oxide)-b-poly(propylene oxide)-b-poly(ethylene oxide) gels"; J Control Release; vol. 70, No. 1-2; pp. 157-167, Jan. 29, 2001.

Amiji, M., et al.; "Prevention of Protein Adsorption and Platelet Adhesion on Surfaces by PEO/PPO/PEO Triblock Copolymers"; Biomaterials; No. 10., p. 682-92, 1992.

Liu, Y., et al.; "Small-Angle Neutron Scattering Analysis of the Structure and Interaction of Triblock Copolymer Micelles in Aqueous Solution"; Macromolecultes; No. 7, p. 2236-44, Apr. 7, 1998.

Skrabal et al., *The Hydrolysis Rate of Orthoformic Acid Ethyl Ether*, Chemical Institute of the University of Graz, pp. 1-38, Jan. 13, 1921.

Heller, et al., *Poly(ortho esters)—From Concept to Reality*, Biomacromolecules, vol. 5, No. 5, 2004 (pp. 1625-1632), May 9, 1979.

Schwach-Abdellaoui, et al., *Hydrolysis and Erosion Studies of Autocatalyzed Poly(ortho esters) Containing Lactoyl-Lactyl Acid Dimers*, American Chemical Society, vol. 32, No. 2, 1999 (pp. 301-307).

Ng, et al., *Synthesis and Erosion Studies of Self-Catalyzed Poly(ortho ester)s*, American Chemical Society, vol. 30, No. 4, 1997 (pp. 770-772).

Ng, et al., *Development Of A Poly(ortho ester) prototype With A Latent Acid In The Polymer Backbone For 5-fluorouracil Delivery*, Journal of Controlled Release 65 (2000), (pp. 367-374).

Rothen-Weinhold, et al., Release of BSA from poly(ortho ester) extruded thin strands, *Journal of Controlled Release 71*, 2001, (pp. 31-37).

Heller, et al., *Poly(ortho ester)s—their development and some recent applications*, European Journal of Pharmaceutics and Biopharmaceutics, 50, 2000, (pp. 121-128).

Heller, et al., *Poly(ortho esters); synthesis, characterization, properties and uses*, Advanced Drug Delivery Reviews, 54, 2002, (pp. 1015-1039).

Heller, et al., *Poly(ortho esters) For The Pulsed And Continuous Delivery of Peptides And Proteins*, Controlled Release and Biomedical Polymers Department, SRI International, (pp. 39-46).

Zignani, et al., *Subconjunctival biocompatibility of a viscous bioerodable poly(ortho ester)*, J. Biomed Mater Res, 39, 1998, pp. 277-285.

Toncheva, et al., *Use of Block Copolymers of Poly(Ortho Esters) and Poly (Ethylene Glycol)*, Journal of Drug Targeting, 2003, vol. 11(6), pp. 345-353.

Schwach-Abdellaoui, et al., *Control of Molecular Weight For Auto-Catalyzed Poly(ortho ester) Obtained by Polycondensation Reaction*, International Journal of Polymer Anal. Charact., 7: 145-161, 2002, pp. 145-161.

Heller, et al., *Release of Norethindrone from Poly(Ortho Esters)*, Polymer Engineering and Science, Mid-Aug. 1981, vol. 21, No. 11 (pp. 727-731).

Foreign communication related to a counterpart application dated Jul. 25, 2006.

Cordes, et al., *Mechanism and Catalysis for Hydrolysis of Acetals, Ketals, and Other Esters*, Department of Chemistry, Indiana University, Bloomington, Indiana, Chemical Reviews, 1974, vol. 74, No. 5, pp. 581-603.

Todd, et al., *A Chemcial "Trigger" Useful for Oilfield Applications*, Society of Petroleum Engineers, Inc., SPE 92709, Feb. 4, 2005.

Office Action from U.S. Appl. No. 11/244,345, filed Mar. 27, 2008.

Office Action from U.S. Appl. No. 11/128,060, filed Mar. 25, 2008.

U.S. Appl. No. 10/864,061, filed Jun. 9, 2004 Blauch, et al.

U.S. Appl. No. 10/864,618, filed Jun. 9, 2004, Blauch, et al.

U.S. Appl. No. 11/128,060, filed May 12, 2005, Saini.

U.S. Appl. No. 10/650,101, filed Aug. 26, 2003, Todd, et al.
U.S. Appl. No. 10/736,152, filed Dec. 15, 2003, Todd.
U.S. Appl. No. 10/765,334, filed Jan. 27, 2004, Todd, et al.
U.S. Appl. No. 10/768,323, filed Jan. 30, 2004, Roddy, et al.
U.S. Appl. No. 10/768,864, filed Jan. 30, 2004, Roddy, et al.
U.S. Appl. No. 10/769,490, filed Jan. 30, 2004, Roddy, et al.
U.S. Appl. No. 10/783,207, filed Feb. 20, 2004, Surjaatmadja, et al.
U.S. Appl. No. 10/802,340, filed Mar. 17, 2004, Reddy, et al.
U.S. Appl. No. 10/803,668, filed Mar. 17, 2004, Todd, et al.
U.S. Appl. No. 10/803,689, filed Mar. 18, 2004, Todd, et al.
U.S. Appl. No. 10/897,509, filed Jul. 23, 2004, Pauls, et al.
U.S. Appl. No. 10/915,024, filed Aug. 10, 2004, Nguyen.
U.S. Appl. No. 10/932,749, filed Sep. 2, 2004, Harris, et al.
U.S. Appl. No. 10/933,705, filed Sep. 3, 2004, Kalman.
U.S. Appl. No. 10/950,072, filed Sep. 24, 2004, Nguyen, et al.
U.S. Appl. No. 10/991,228, filed Nov. 17, 2004, Munoz, Jr., et al.
U.S. Appl. No. 10/991,248, filed Nov. 17, 2004, Munoz, Jr., et al.
U.S. Appl. No. 11/046,043, filed Jan. 28, 2005, Todd, et al.
U.S. Appl. No. 11/046,652, filed Jan. 28, 2005, Todd, et al.
U.S. Appl. No. 11/047,876, filed Jan. 31, 2005, Mang, et al.
U.S. Appl. No. 11/048,417, filed Jan. 31, 2005, Mang, et al.
U.S. Appl. No. 11/048,465, filed Feb. 1, 2005, Todd, et al.
U.S. Appl. No. 11/048,489, filed Feb. 1, 2005, Todd, et al.
U.S. Appl. No. 11/049,464, filed Feb. 2, 2005, Mang, et al.
U.S. Appl. No. 11/049,483, filed Feb. 2, 2005, Mang, et al.
U.S. Appl. No. 11/049,600, filed Feb. 2, 2005, Mang, et al.
U.S. Appl. No. 11/049,601, filed Feb. 2, 2005, Mang, et al.
U.S. Appl. No. 11/062,943, filed Feb. 22, 2005, Saini, et al..
U.S. Appl. No. 11/062,956, filed Feb. 22, 2005, Surjaatmadja, et al.
U.S. Appl. No. 11/147,093, Todd, et al., (Pending).
U.S. Appl. No. 11/127,583, Saini, (Pending).
Simmons, et al., *Poly(phenyllactide): Synthesis, Characterization, and Hydrolytic Degradation*, Biomacromolecules, vol. 2, No. 2, 2001 (pp. 658-663).
Yin, et al., *Preparation and Characterization of Substituted Polylactides*, American Chemical Society, vol. 32, No. 23, 1999 (pp. 7711-7718).
Yin, et al., *Synthesis and Properties of Polymers Derived form Substituted Lactic Acids*, American Chemical Society, Ch. 12, 2001 (pp. 147-159).
Cantu, et al, *Laboratory and Field Evaluation of a Combined Fluid-Loss-Control Additive and Gel Breaker for Fracturing Fluids*, SPE 18211, Society of Petroleum Engineers, 1990.
Love, et al, *Selectively Placing Many Fractures in Openhole Horizontal Wells Improves Production*, SPE 50422, Society of Petroleum Engineers, 1998.

McDaniel, et al, *Evolving New Stimulation Process Proves Highly Effective in Level 1 Dual-Lateral Completion*, SPE 78697, Society of Petroleum Engineers, 2002.
Albertsson, et al, *Aliphatic Polyesters: Systhesis, Properties and Applications*, Advances in Polymer Science, vol. 157, Degradable Aliphatic Polyesters, 2002.
Dechy-Cabaret, et al, *Controlled Ring-Opening Polymerization of Lactide and Glycolide*, American Chemical Society, Chemical Reviews, A-Z, AA-AD, received 2004.
Funkhouser, et al, *Synthetic Polymer Fracturing Fluid for High-Temperature Applications*, SPE 80236, Society of Petroleum Engineers, 2003.
*Chelating Agents*, Encyclopedia of Chemical Technology, vol. 5 (764-795).
Vichaibun, et al, *A New Assay for the Enzymatic Degradation of Polylactic Acid, Short Report, ScienceAsia*, vol. 29, 2003 (pp. 297-300).
Halliburton, *SurgiFrac$^{SM}$ Service, A Quick and Cost-Effective Method to Help Boost Production From Openhole Horizontal Completions, Halliburton Communications*, HO3297, 2002.
Halliburton, *Cobra Frac$^{SM}$ Service, Coiled Tubing Fracturing—Cost-Effective Method for Stimulating Untapped Reserves*, HO2319R, Halliburton Energy Services, 2000.
Halliburton, *CobraJet Frac$^{SM}$ Service, Cost-effective Technology That Can Help Reduce Cost Per BOE Produced, Shorten Cycle Time and Reduce Capex*, Halliburton Communications.
Y. Chiang et al.: "Hydrolysis of Ortho Esters: Further Investigations of the Factors Which Control the Rate-Determining Step," Engineering Information Inc., NY, NY, vol. 105, No. 23 (XP-002322842), Nov. 16, 1983.
M. Ahmad, et al.: "Ortho Ester Hydrolysis: Direct Evidence for a Three-Stage Reaction Mechanism," Engineering Information Inc., NY, NY, vol. 101, No. 10 (XP-002322843), May 9, 1979.
Office Action for U.S. Appl. No. 11/128,060 mailed Nov. 26, 2008.
NatureWorks Product Bulletin entitled NatureWorks PLA Polymer 3001D, Injection Molding Process Guide, 2005.
NatureWorks Product Bulletin entitled NatureWorks PLA Polymer 4060D, For Heat Seal Layer in Coextruded Oriented Films, 2005.
NatureWorks article entitled NatureWorks, Crystallizing and Drying of PLA, 2005.
Office Action for U.S. Appl. No. 11/244,345, dated Feb. 17, 2009.
Office Action for U.S. Appl. No. 11/128,060 dated May 14, 2009.

* cited by examiner

DEGRADABLE SURFACTANTS AND METHODS FOR USE

CROSS-REFERENCE TO RELATED APPLICATIONS

This application is related to co-pending U.S. application Ser. No. 11/128,060, entitled "Degradable Surfactants and Methods for Use," filed concurrently herewith, the entire disclosure of which is incorporated herein by reference.

BACKGROUND

The present invention relates to methods and compositions for treating subterranean formations. More particularly, the present invention relates to treatment fluids comprising degradable surfactants and associated methods of use.

Surfactants may be used in a variety of subterranean treatments. Such treatments include, but are not limited to, drilling, stimulation treatments (e.g., fracturing treatments, acidizing treatments), and completion operations (e.g., sand control treatments). As used herein, the term "treatment," or "treating," refers to any subterranean operation that uses a fluid in conjunction with a desired function and/or for a desired purpose. The term "treatment," or "treating," does not imply any particular action by the fluid or any particular component thereof. In these conventional subterranean treatments, the surfactants may be used for a number of purposes such as emulsifying agents, non-emulsifying agents, foaming agents, defoaming agents, viscosifying (or gelling) agents, dispersants, wetting agents, and the like.

While a variety of surfactants have been used in subterranean treatments, various problems have been associated with their use. For instance, certain surfactants used heretofore may have undesirable environmental characteristics and/or may be limited by strict environmental regulations in certain areas of the world. As a result, use of these surfactants in subterranean treatments may result in the potential for the bioaccumulation and/or persistence of such surfactants in the environment, which may create potential dangers for their use, such as adverse effects on shrimp and other aqueous aquatic species.

SUMMARY

The present invention relates to methods and compositions for treating subterranean formations. More particularly, the present invention relates to treatment fluids comprising degradable surfactants and associated methods of use.

An embodiment of the present invention provides a method of treating a subterranean formation. In an example of such a method, the method may comprise providing a treatment fluid comprising an aqueous fluid, and a degradable surfactant derived from a degradable polymer; and introducing the treatment fluid into a well bore that penetrates the subterranean formation.

Another embodiment of the present invention provides a method of treating a subterranean formation. In an example of such a method, the method may comprise providing an emulsified treatment fluid comprising an oleaginous phase, an aqueous phase, and an emulsifying agent comprising a degradable surfactant derived from a degradable polymer; and introducing the emulsified treatment fluid into a well bore that penetrates the subterranean formation.

Another embodiment of the present invention provides a method of treating a subterranean formation. In an example of such a method, the method may comprise providing a foamed treatment fluid comprising an aqueous fluid, a gas, and a foaming agent comprising a degradable surfactant derived from a degradable polymer; and introducing the emulsified treatment fluid into a well bore that penetrates the subterranean formation.

The features and advantages of the present invention will be apparent to those skilled in the art. While numerous changes may be made by those skilled in the art, such changes are within the spirit of the invention.

DESCRIPTION OF PREFERRED EMBODIMENTS

The present invention relates to methods and compositions for treating subterranean formations. More particularly, the present invention relates to treatment fluids comprising degradable surfactants and associated methods of use. As used herein, the phrase "degradable surfactant" refers to surfactant molecules derived from degradable polymers, wherein the surfactant molecules contain a backbone with repeating units of degradable groups, such as esters or other derivatives, for example, such as polycarbonates, polyacetals, poly(orthoesters), or polyesteramides as the degradable hydrophobic block or tail in the surfactant molecule attached to the hydrophilic polymeric block or head group.

I. Degradable Surfactants

The degradable surfactants useful in the present invention may be any suitable degradable surfactant. Suitable degradable surfactants include degradable block copolymer surfactants that comprise a hydrophilic polymeric block and a hydrophobic degradable polymeric block, degradable polymeric surfactants, and mixtures thereof. As used herein, the phrase degradable block copolymer surfactant is intended to be broad enough to include graft copolymers, as well as block copolymers. As used herein, the phrase "degradable polymeric surfactant" refers to degradable surfactants comprising a degradable hydrophobic portion (e.g, a hydrophobic block or chain) attached to a hydrophilic head group (e.g., ionic, nonionic, amphoteric, or zwitterionic).

Because the degradable surfactants have built into their structure a bond with limited stability, degradation of this bond should at least partially decrease the surface activity of the surfactants. In some embodiments, the degradable surfactants may cleave at the juncture of the hydrophobic and hydrophilic polymeric block for a particular surfactant molecule, which may result in the instantaneous disappearance of the surface activity for that surfactant molecule. As a result, the degradable surfactants are capable of undergoing an irreversible degradation. The term "irreversible," as used herein, means that the degradable surfactant should degrade in situ (e.g., within a well bore) but should not recrystallize or reconsolidate in situ after degradation. The terms "degradation" and/or "degradable" refer to the conversion of materials into smaller components, intermediates, or end products by hydrolytic degradation or by the action of biologically formed entities, such as bacteria or enzymes. "Hydrolytic degradation" refers to both heterogeneous (or bulk erosion) and homogenous (or surface erosion), and any stage of degradation between these two by the action of water on the polymer. This degradation may be the result, inter alia, of a chemical reaction, a thermal reaction, an enzymatic reaction, or a reaction induced by radiation. The degradability of the degradable surfactants used in the present invention depends, in part, on the backbone structure of the hydrophobic portion. For instance, the presence of hydrolysable and/or oxidizable linkages in the backbone often yields a degradable surfactant that will degrade as described herein. The rates at which such surfactants degrade are dependent on the type of repetitive unit, composition, sequence, length, molecular geometry, molecular weight, stereochemistry, morphology (e.g., crystallinity, size of spherulites, and orientation), hydrophilicity, hydrophobicity, surface area, and additives. Also, the environment to which the degradable surfactant is subjected may affect how it degrades, e.g., temperature, presence of moisture, oxygen, microorganisms, enzymes, pH, and the like. Upon degradation, the degradable surfactants may release a desirable degradation product, such as an acid that may be used to break a viscosified treatment fluid, degrade an acid soluble component present in the subterranean formation, or to facilitate the setting of an acid-settable resin.

Among other things, degradation of the degradable surfactants may be sensitive to pH. For example, degradable surfactants comprising an aliphatic polyester hydrophobic portion degrade rapidly at a higher pH (e.g., about 9 to about 14) and may be most stable at a pH of about 6. On the other hand, degradable surfactants comprising a poly(orthoester)hydrophobic portion are stable at higher pHs, but poly(orthoesters) may degrade at pHs of about 8 or less. With an increase in temperature, the hydrolysis of the surfactant should become faster.

The degradable surfactants should be suitable for use at temperatures that they will encounter during subterranean operations. Degradable surfactants containing a poly(lactic acid)hydrophobic portion are generally not suitable for use at bottom hole temperatures greater than about 150° C. However, degradable surfactants containing other hydrophobes, such as poly(caprolactone), may be suitable for use at higher bottom hole temperatures. One of ordinary skill in the art, with the benefit of this disclosure, should be able to determine the appropriate degradable surfactant to use based on, among other things, bottom hole temperatures that may be encountered.

The function that a particular degradable surfactant useful in the present invention may perform depends on a variety of factors. These factors may include, but are not limited to, the choice of the hydrophobic and hydrophilic portions and the relative amounts thereof, and the presence of any cationic, ionic, non-ionic, amphoteric, or Zwitterionic groups. For example, whether an oil-in-water ("O/W") or water-in-oil ("W/O") emulsion is formed may be determined by the relative hydrophobicity of the degradable polymeric block or tail and the hydrophilicity of the hydrophilic polymeric block or head group. The HLB of the surfactant may provide a quantitative prediction of whether the surfactant will facilitate the formation of an O/W or a W/O emulsion. HLB is a well known system that can be determined from the chemical formula of the surfactant using empirically determined group numbers. For the degradable polymeric surfactants utilized in the present invention, the HLB may be controlled by controlling the length of the polymeric chain during the polymerization reaction. For example, where the degradable polymeric surfactant is prepared from a glycolide or a lactide, the HLB of the degradable polymeric surfactant may be controlled during the ring-opening by controlling the length of the lactide or glycolide chains. Even the HLB system is only semi-empirical, and other factors (such as the relative phase volume of oil and water) may have a considerable influence on the type of emulsion formed.

By varying the above-listed factors, the specific properties of the degradable surfactants such as solubility, wettability, emulsifying, foaming, antifoaming, cloud point, gelling, solubilizing agent, and the like may be varied. For example, where used as an emulsifying agent, a degradable surfactant having an HLB of from about 3 to about 6 may be suitable to stabilize a W/O emulsion. In other embodiments, where used as an emulsifying agent, a degradable surfactant having an HLB of from about 8 to about 18 may be suitable to stabilize an O/W. Those of ordinary skill in the art, with the benefit of this disclosure, will be able to determine the appropriate degradable surfactants to use for a particular application.

A. Degradable Block Copolymer Surfactants

In some embodiments of the present invention, suitable degradable surfactants may be a degradable block copolymer surfactant that comprises a hydrophilic polymeric block and a hydrophobic degradable polymeric block. These degradable block copolymer surfactants may be prepared by any suitable process, including, but not limited to, polycondensation reactions, ring-opening polymerizations, free radical polymerizations, anionic polymerizations, cationic polymerizations, coordinative ring-opening polymerizations, hydrogen-transfer polymerization, and any other suitable process. Suitable degradable block copolymer surfactants include block copolymer surfactants, graft copolymer surfactants, and block-graft copolymer surfactants. Examples of suitable degradable block copolymer surfactants include linear diblock, triblock, or multiblock arrays, e.g., of the type A-B, A-B-A, B-A-B, A-B-A-B-A-B, $(A-B)_n$, where A and B are hydrophilic and hydrophobic degradable polymeric blocks, respectively, and n is any integer greater than or equal to 1. Degradable block copolymer surfactants of branched structure and macrocyclic structures, such as those depicted below, may also be suitable for use in the present invention.

Example of Branched Block Copolymer

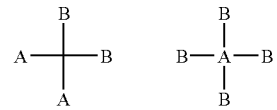

Example of Macrocyclic Structure

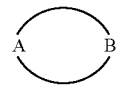

Suitable degradable block copolymer surfactants also may include graft copolymers and block-graft copolymers. An example structure for a block-graft copolymer is listed below.

Example of Graft Block Copolymer

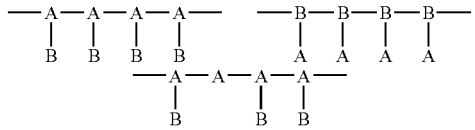

In one embodiment, a suitable graft copolymer surfactant may comprise a hydrophilic polymeric backbone having branches of a hydrophobic degradable polymeric block along its length, for example, guar grafted with polylactic acid or poly(caprolactone). In another embodiment, a suitable graft copolymer surfactant may comprise a hydrophobic degradable polymeric backbone having branches of a hydrophilic polymer along its length.

The hydrophilic polymeric block of the degradable block copolymer surfactants may comprise any suitable degradable or non-degradable hydrophilic polymer, including, but not limited to, poly(alkylene glycols) (e.g., poly(ethylene glycol)), poly(alcohols) (e.g., poly(vinyl alcohols)), poly(vinyl pyrrolidone), polysaccharides (e.g., dextran, cellulose, guar, starch, xanthan, etc.), chitins, chitosans, proteins, poly(amino acids) (e.g., poly(aspartic acid)), poly(alkylene oxides) (e.g., poly(ethylene oxides)), poly(amides) (e.g., poly(acrylamide)), poly(acids) (e.g., poly(acrylic acid)), polyols (e.g., sorbitol, glucose, fructose, mannose, etc.), and blends and copolymers thereof. The term "copolymer" as used herein is not limited to combinations of two polymers, but includes any combination of polymers, e.g., terpolymers and the like. In certain embodiments, the hydrophilic polymer block comprises a poly(akylene glycol), such as poly(ethylene glycol). In certain embodiments, the hydrophilic block comprises a poly(alkylene oxide), such as poly(ethylene oxide). Generally, the hydrophilic polymeric block of the degradable block copolymer surfactant may have a number average molecular weight in the range of from about 50 Daltons to about 6,000,000 Daltons. One of ordinary skill in the art, with the benefit of this disclosure, will be able to determine the appropriate number average molecular weight for the hydrophilic polymeric block based on a variety of factors, including the desired hydrophilic/lipophilic balance ("HLB") and the particular function the degradable surfactant will perform.

The hydrophobic degradable polymeric block of the degradable block copolymer surfactants may include any suitable polyester, or other derivative, including, but not limited to, poly(anhydrides), poly(orthoesters), poly(lactic acids), poly(glycolic acids), poly(caprolactones), poly(hydroxybutyrates), polyphosphazines, poly(carbonates), polyacetals, polyetheresters, polyesteramides, polycyanoacrylates, polyurethanes, polyacrylates, and blends and copolymers thereof. In certain embodiments, the hydrophobic degradable polymeric block comprises a poly(lactic acid). As used herein, "poly(lactic acid)" refers to a polymer that may be synthesized from lactic acid by a condensation reaction, or more commonly by ring-opening polymerization of a cyclic lactide monomer, and is sometimes referred to as "PLA," "polylactate," or "polylactide." In certain embodiments, the hydrophobic degradable polymeric block comprises a poly(caprolactone). Because poly(caprolactone) has five methylene groups in its monomeric segment, it is generally more hydrophobic than poly(lactic acid) and thus may be more suitable for forming an oil-soluble block where desired. Polyamides and polyurethanes are typically susceptible to hydrolytic and enzymatic hydrolysis of, for example, of their amide and urethane groups. Suitable aliphatic polyesters may, for example, comprise or be substituted with hydrophobic groups, such as alkyl, aralkyl, or aryl groups, to increase their hydrophobicity if desired. In some embodiments, a suitable hydrophobic degradable polymeric block of the degradable block copolymer surfactant may have a number average molecular weight in the range of from about 500 Daltons to about 5,000 Daltons. In other embodiments, a suitable hydrophobic degradable polymeric block of the degradable block copolymer surfactant may have a number average molecular weight in the range of from about 1,000 Daltons to about 20,000 Daltons. One of ordinary skill in the art, with the benefit of this disclosure, will be able to determine the appropriate number average molecular weight for the hydrophobic degradable polymeric block based on a variety of factors, including the desired hydrophilic/lipophilic balance and the particular function for the surfactant to perform.

To obtain a surfactant suitable for a particular application, the proportion of a hydrophilic polymeric block to a hydrophobic degradable polymeric block in a degradable block copolymer surfactant of the present invention may be modified, inter alia, based on the desired functionality of the degradable block copolymer surfactant. In some embodiments of the present invention, the hydrophilic polymeric block is present in a degradable block copolymer surfactant in an amount in the range of from about 5% to about 95% by weight of the surfactant, and the hydrophobic degradable polymeric block is present in the degradable block copolymer surfactant in an amount in the range of from about 5% to about 95% by weight of the surfactant.

One example of a suitable degradable block copolymer surfactant is an A-B diblock copolymer of poly(ethylene glycol)methyl ether and poly(lactic acid). Another example of a suitable degradable block copolymer surfactant is an A-B-A triblock copolymer of poly(ethylene glycol) and poly(lactic acid). Another example of a suitable degradable block copolymer surfactant is an A-B diblock or an A-B-A triblock copolymer of poly(lactide-co-glycolide) and poly(ethylene glycol) with an ionizable group on each end of the polymer chain. Another example of a suitable degradable block copolymer surfactant is a block copolymer of poly(ethylene glycol)methyl ether and poly(ε-caprolactone). Another example of a suitable degradable block copolymer surfactant is a triblock copolymer of poly(ethylene glycol) and poly(ε-caprolactone).

The degradable block copolymer surfactants useful in the present invention further may be modified to be ionic, cationic, anionic, amphoteric, or Zwitterionic, if desired. In some embodiments, at least a portion of a degradable block copolymer surfactant may be modified. These ionic, cationic, anionic, amphoteric, or Zwitterionic groups may be added to the ends or sides of the hydrophilic polymeric block or the hydrophobic degradable polymeric block. Non-ionic groups also may be added to the ends or sides of the hydrophilic polymeric block or the hydrophobic degradable polymeric block. In certain embodiments, suitable degradable block copolymer surfactants further may comprise a terminal acid group, an alcohol group, an amine group, or a tertiary amine group attached to the hydrophilic or hydrophobic degradable polymeric block.

While optional, the presence of ionic groups within the hydrophilic polymeric block of a degradable block copolymer surfactant or as a head group on the hydrophobic degradable polymeric block may be desired because the high water solubility of such charged groups may permit the use of a relatively small hydrophilic polymeric block and the interaction of the charged groups may enhance the stability of the degradable block copolymer surfactants by inhibiting aggregation. Examples of suitable cationic groups that may be added to the hydrophilic polymeric block or as a head group to the hydrophobic degradable polymeric block include, but are not limited to, a pyridinium group; a primary, secondary, or tertiary amine that are protonated at low or middle pH ranges; and quaternary ammonium compounds; and salts thereof. For example, a suitable quaternary ammonium degradable block copolymer surfactant salt is described by Formula No. 1 below:

Formula No. 1

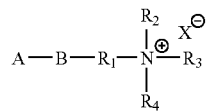

wherein $R_1$ is a methylene chain of from 1 to 4 carbons, alkyl, hydroxyl alkyl, ethoxylated alkyl, or arylalkyl group; $R_2$ is an alkyl, hydroxyl alkyl, ethoxylated alkyl, or arylalkyl group; $R_3$ is an alkyl, hydroxyl alkyl, ethoxylated alkyl, or an arylalkyl group; $R_4$ is an alkyl, hydroxyl alkyl, ethoxylated alkyl, or an arylalkyl group; and X is a chlorine, bromine, iodine, ½SO$_4$, HSO$_4$, CH$_3$SO$_3$, or the like. A and B may be hydrophilic and hydrophobic degradable polymeric blocks, respectively, as described previously.

Another example of a suitable quaternary ammonium degradable block copolymer surfactant salt is described by Formula No. 2 below:

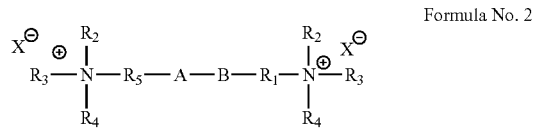

Formula No. 2 wherein $R_1$ is a methylene chain of from 1 to 4 carbons, alkyl, hydroxyl alkyl, ethoxylated alkyl, or arylalkyl group; $R_2$ is an alkyl, hydroxyl alkyl, ethoxylated alkyl, or arylalkyl group; $R_3$ is an alkyl, hydroxyl alkyl, ethoxylated alkyl, or an arylalkyl group; $R^4$ is an alkyl, hydroxyl alkyl, ethoxylated alkyl, or an arylalkyl group; $R_5$ is a methylene chain of from 1 to 4 carbons, alkyl, hydroxyl alkyl, ethoxylated alkyl, or arylalkyl group; X is a chlorine, bromine, iodine, ½SO$_4$, HSO$_4$, CH$_3$SO$_3$, or the like. A and B may be hydrophilic and hydrophobic degradable polymeric blocks, respectively, as described previously.

Examples of suitable anionic groups that may be added to the hydrophilic polymeric block or as a head group to the hydrophobic degradable polymeric block include, but are not limited to, carboxylate groups, phosphate groups, phosphonate groups, sulfate groups, sulfonate groups, and their salts. Examples of suitable non-ionic groups that may be added to the hydrophilic polymeric block or as a head group to the hydrophobic degradable polymeric block include, but are not limited to, carboxylic acid (low pH), alcohol, polyols, sugars (e.g., sorbitan, sorbitol), and amines (neutral and high pH). In yet other embodiments, charged groups may be added to both the hydrophilic block and the hydrophobic degradable polymeric block of the degradable block copolymer surfactants. In yet another embodiment, the degradable block copolymer surfactants may be made amphoteric by the incorporation of groups such as amine alkanoates (e.g., betaines) or alkyl amine oxides into the degradable block copolymer surfactant. In some embodiments, amphoteric surfactants may be desirable, among other things, due to their compatibility with other surfactants, low skin and eye irritation, absorbability onto both positively and negatively charged surfaces, and low solubility in organic solvents.

Techniques that can be used for the preparation of suitable degradable block copolymer surfactants of the present invention are well known. For example, degradable block copolymer surfactants useful in the present invention may be formed by any suitable process, including, but not limited to, polycondensation reactions, ring-opening polymerizations, free radical polymerizations, anionic polymerizations, cationic polymerizations, coordinative ring-opening polymerizations, hydrogen-transfer polymerization, and any other suitable process. Once prepared, the degradable block copolymer surfactant, in certain embodiments, may be reacted with certain compounds to add a terminal acid group thereto, for example, succinic anhydride may be reacted with the terminal alcohol group of the degradable block copolymer surfactant to form a terminal acid group. In one certain embodiment, a suitable A-B diblock copolymer surfactant of poly(ethylene glycol) methyl ether and poly(lactic acid) that contains a terminal acid group may be prepared as illustrated below:

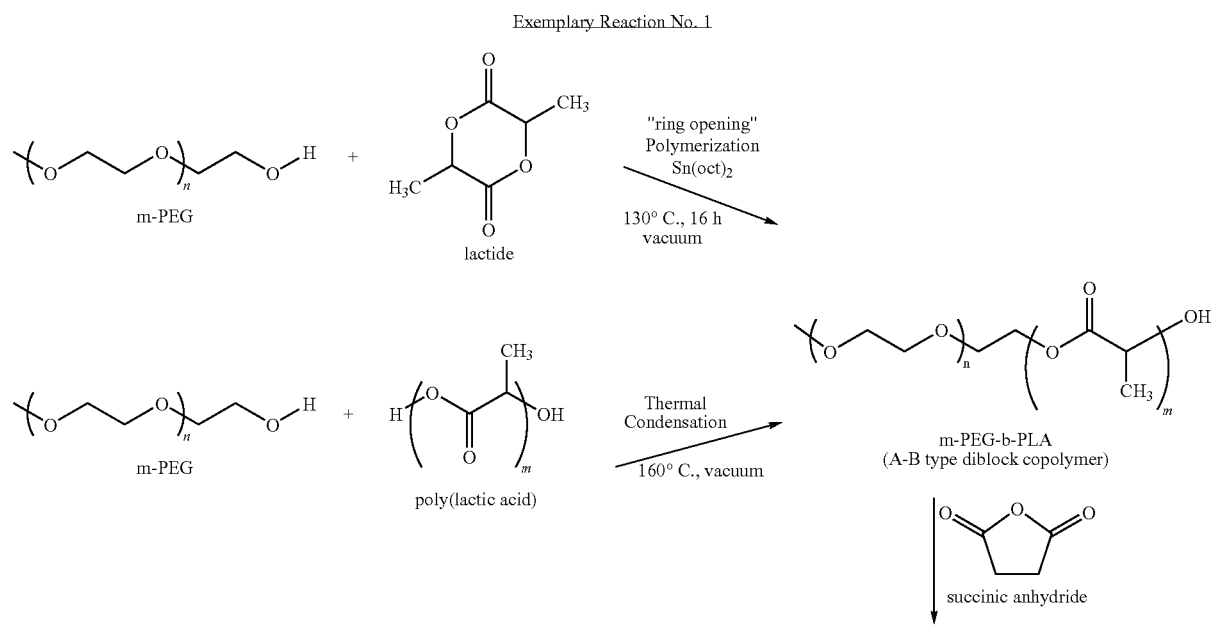

Exemplary Reaction No. 1

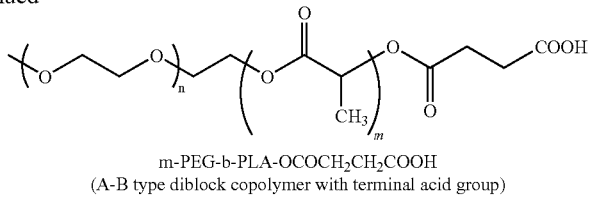

m-PEG-b-PLA-OCOCH₂CH₂COOH
(A-B type diblock copolymer with terminal acid group)

Similarly, in another embodiment, a suitable B-A-B triblock copolymer surfactant of poly(ethylene glycol) and poly(ε-caprolactone) that contains a terminal acid group may be prepared as illustrated below.

Exemplary Reaction No. 2

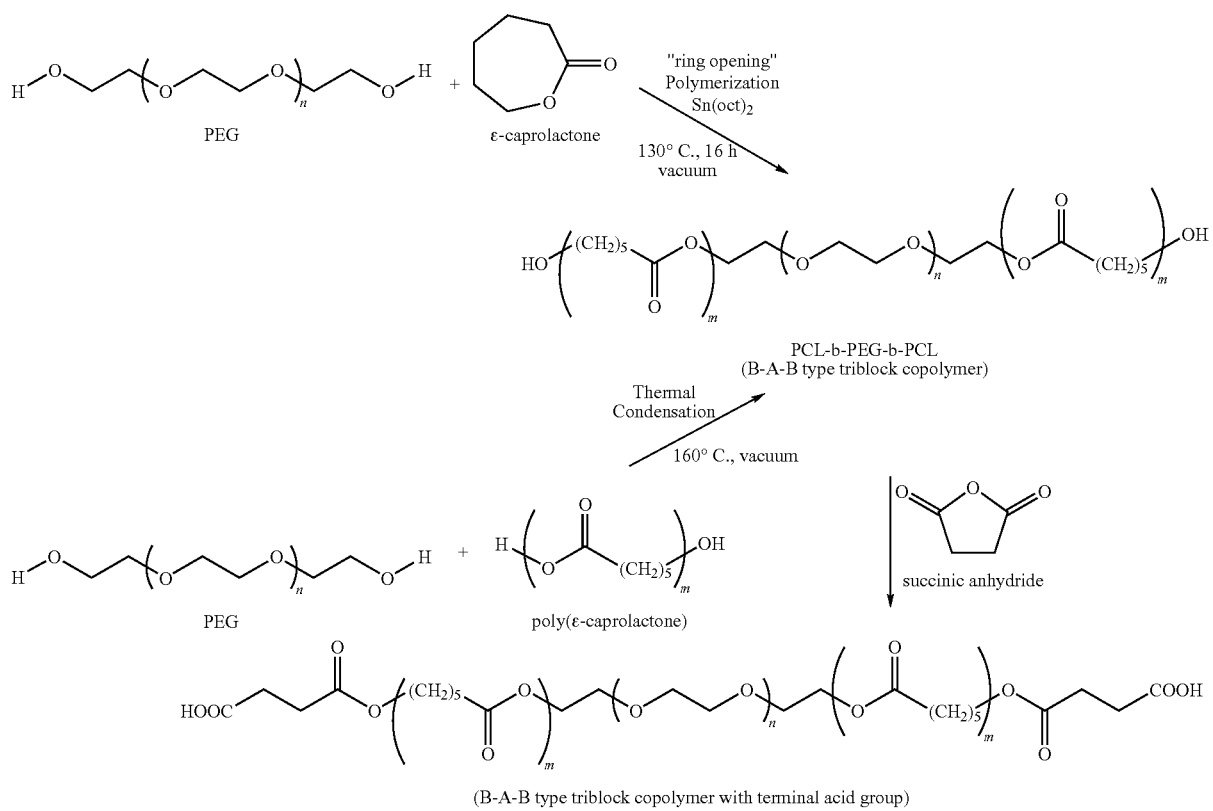

(B-A-B type triblock copolymer with terminal acid group)

In another embodiment, a suitable graft copolymer surfactant that comprises a guar backbone having branches of poly(ε-caprolactone) along its length may be prepared as illustrated below:

Exemplary Reaction No. 3

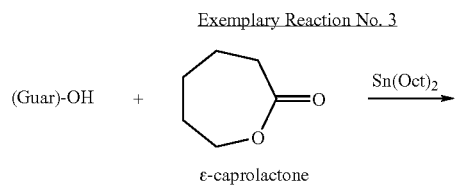

-continued

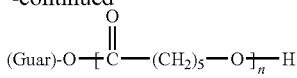

Guar grafted with hydrophobic poly(ε-caprolactone)

B. Degradable Polymeric Surfactants

Degradable polymeric surfactants also may be suitable for use as the degradable surfactants in the methods and compositions of the present invention. As previously discussed, degradable polymeric surfactants comprise a degradable hydrophobic portion (e.g., a hydrophobic block or chain) attached to a hydrophilic head group (e.g., ionic, nonionic, amphoteric, or zwitterionic). Suitable hydrophilic head groups include anionic groups, cationic groups, amphoteric groups, Zwitterionic groups, or non-ionic groups. Further, such hydrophilic head groups may be on both ends or on only one end of the degradable polymeric surfactant. An example of a suitable degradable polymeric surfactant is described by Formula No. 3 below:

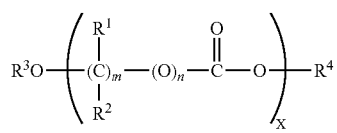

Formula No. 3 wherein $R^1$ is a hydrogen, alkyl, aryl, alkylaryl, acetyl, or heteroatoms; $R^2$ is a hydrogen, alkyl, aryl, alkylaryl, acetyl, or heteroatoms; $R^3$ is hydrogen, alkyl, aryl, alkylaryl, acetyl, alkoxyl, benzoyl, or heteroatoms; or a group comprising an anionic group, a cationic group, or a non-ionic group; $R^4$ is a group such as H, Na, K, or Li, or a group comprising an anionic group, a cationic group, or a non-ionic group; n can be 0 or 1; m can be an integer between 1 and 20; and X can be an integer between 10 and 10,000. The above formula represents a non-limiting example of a suitable degradable polymeric polycyanocarlyates, polyurethanes, polyacrylates, and blends and copolymers thereof. In certain embodiments, the hydrophobic degradable polymeric block comprises a poly (lactic acid). In certain embodiments, the hydrophobic degradable polymeric block comprises a poly(caprolactone). Because poly(caprolactone) has five methylene groups in its monomeric segment, it is generally more hydrophobic than poly(lactic acid) and thus may be more suitable for forming an oil-soluble block where desired. Polyamides and polyurethanes are typically susceptible to hydrolytic and enzymatic hydrolysis, for example, of their amide and urethane groups. Such aliphatic polyesters may, for example, comprise or be substituted with hydrophobic groups, such as alkyl, aralkyl, or aryl groups, to increase their hydrophobicity if desired.

The degradable polymeric surfactants of the present invention may be formed by any suitable process, including, but not limited to, polycondensation reactions, ring-opening polymerizations, free radical polymerizations, anionic polymerizations, cationic polymerizations, coordinative ring-opening polymerizations, hydrogen-transfer polymerization, and any other suitable process. Ionic (e.g., cationic or anionic), non-ionic, amphoteric, or Zwitterionic head groups may be added to the aliphatic polyester prior to or after the process to form the degradable polymeric surfactant. The following exemplary reaction illustrates the preparation of a suitable degradable polymer with a hydrophobic end tail from a lactide or a poly(lactic acid) suitable for conversion to a degradable polymeric surfactant.

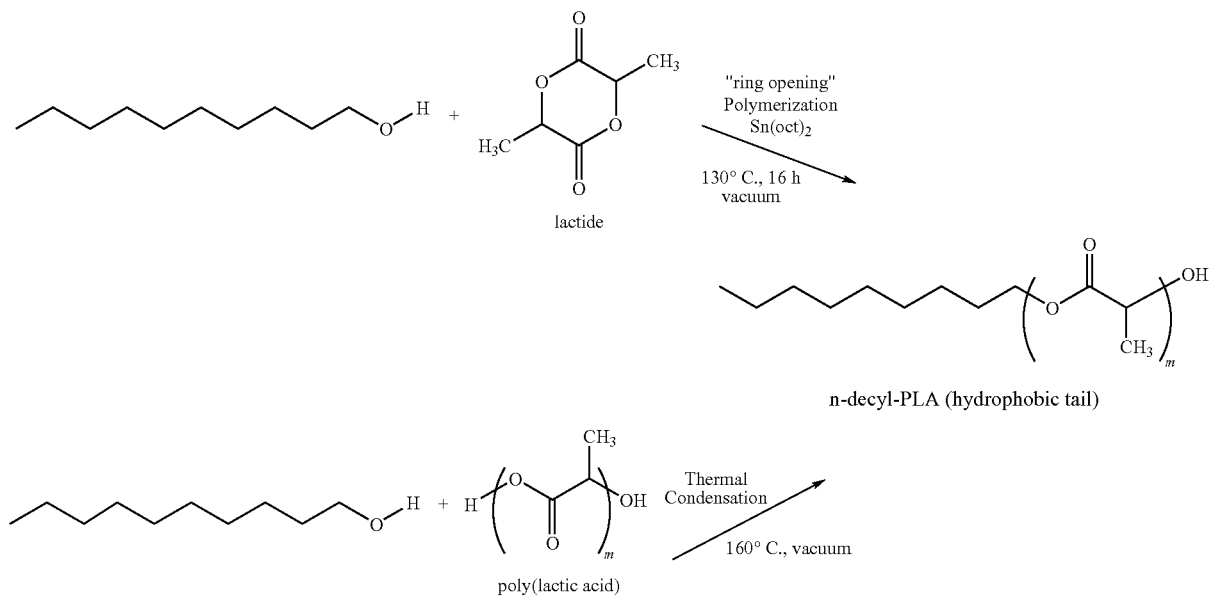

surfactant and numerous other embodiments of degradable polymeric surfactants are suitable for use in the present invention.

Suitable examples of degradable polymers that may be used in the preparation of the degradable polymeric surfactants may include any suitable polyester, or other derivative, including, but not limited to, poly(anhydrides), poly(orthoesters), poly(lactic acid), poly(glycolic acids), poly(caprolactones), poly(hydroxybutyrates), polyphosphazines, poly(carbonates), polyacetals, polyetheresters, polyesteramides, In some embodiments, the degradable polymeric surfactant may be a reaction product of a ring-opening polymerization reaction of a nucleophile with a cyclic lactone (e.g., a lactide, a glycolide, or a caprolactone). The nature of the nucleophile, e.g., whether it contains anionic, cationic, or non-ionic groups, may further help to control the functionality of the degradable polymeric surfactant. Examples of suitable cationic groups that may be added to the degradable polymeric surfactants include, but are not limited to, pyridinium group, primary secondary or tertiary amines that are protonated at low or middle pH ranges, and quaternary ammonium compounds and salts thereof. The following example illustrates the ring-opening reaction of α-caprolactone by N,N-dimethylethanolamine in the presence of a catalytic amount of tinoctoate and the subsequent quaterniztion of the reaction product to yield a quaternary amine cationic surfactant.

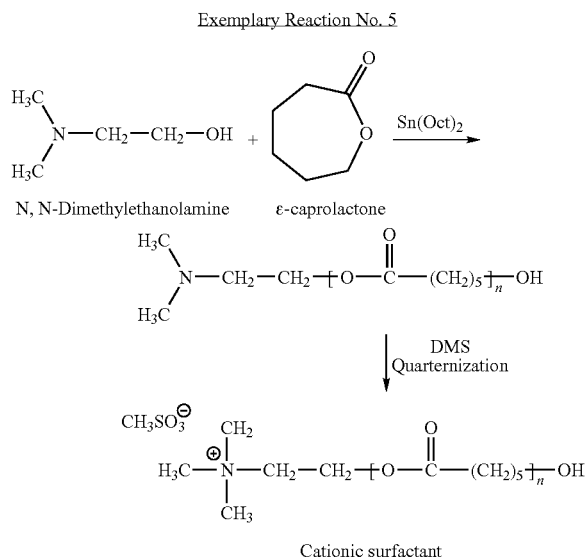

Examples of suitable anionic groups that may be added to the degradable polymeric surfactants include, but are not limited to, carboxylate groups, phosphate groups, phosphonate groups, sulfate groups, sulfonate groups, and their salts. For example, the head group may comprise a salt of a carboxylic acid. A sulfate group may be incorporated into the degradable polymeric surfactant as depicted in the example reaction below.

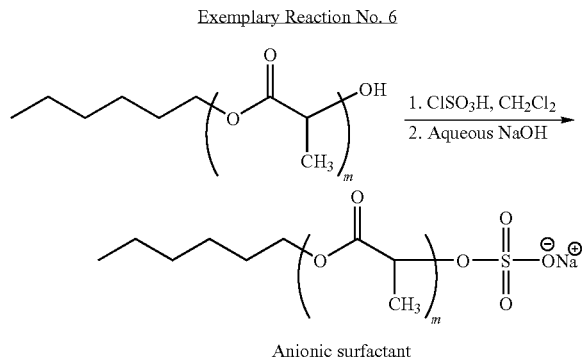

Examples of suitable non-ionic groups that may be added to the degradable polymeric surfactants include, but are not limited to, carboxylic acid (low pH), alcohol, polyols, sugars (e.g., sorbitan, sorbitol), and amines (neutral and high pH). In yet another embodiment, the degradable polymeric surfactants may be made amphoteric by the incorporation of groups such as amine alkanoates (e.g., betaines) or alkyl amine oxides. In some embodiments, amphoteric surfactants may be desirable, among other things, due to their compatibility with other surfactants, low skin and eye irritation, absorbability onto both positively and negatively charged surfaces, and low solubility in organic solvents The molecular weight of the degradable hydrophobic portion (e.g, a hydrophobic block or chain) may be controlled to provide a degradable polymeric surfactant with a molecular weight suitable for a particular application. In some embodiments, the molecular weight of the degradable hydrophobic portion may be in the range of from about 200 Daltons to about 50,000 Daltons. In another embodiment, the molecular weight of the degradable hydrophobic portion may be in the range of from about 1,000 Daltons to about 20,000 Daltons.

II. Exemplary Treatment Fluids of the Present Invention

The treatments fluids of the present invention may comprise an aqueous fluid and a degradable surfactant. Generally, the degradable surfactants may be included in any treatment fluid suitable for any of a variety of subterranean treatments, including, but not limited to, drilling operations, stimulation treatments (e.g., fracturing treatments, acidizing treatments), and completion operations (e.g., sand control treatments). These treatment fluids may include aqueous fluids, aqueous gels, viscoelastic surfactant gels, oil gels, foamed gels, and emulsions (e.g., W/O or O/W). Among other things, the degradable surfactants may be included in the treatment fluids for any of a number of purposes, including to act at least partially as emulsifying agents, non-emulsifying agents, foaming agents, defoaming agents, viscosifying (or gelling) agents, dispersants, wetting agents, combinations thereof, and the like.

Suitable aqueous fluids may include, but are not limited to, freshwater, seawater, saltwater (e.g., saturated or unsaturated), and brines (e.g., saturated saltwater). The aqueous fluid may be from any source, provided that it does not adversely affect the stability of the foamed treatment fluids of the present invention.

The appropriate amount of the degradable surfactant to include in the treatment fluids of the present invention will vary depending upon the particular application. For example, in certain embodiments, such as foaming, emulsifying, or wetting, the degradable surfactants may be present in the treatment fluids of the present invention in an amount in the range of from about 0.01% to about 10% by weight. In another embodiment, such as viscosifying, the degradable surfactant may be present in the treatments fluids of the present invention in an amount up to about 40% by weight of the treatment fluid. One of ordinary skill in the art, with the benefit of this disclosure, will be able to determine the appropriate amount of the degradable surfactant to include in the treatments fluids for a particular application.

For the emulsifying embodiments, the treatment fluids of the present invention may be an emulsified treatment fluid, the emulsified treatment fluid comprising an oleaginous phase, an aqueous phase, and an emulsifying agent that comprises a degradable surfactant. As referred to herein, the phrase "emulsified treatment fluid" refers to any subterranean treatment fluid that has a continuous phase and a discontinuous phase, such as a W/O emulsion or an O/W emulsion. In an O/W emulsion, the aqueous phase is the continuous (or external) phase and the oleaginous phase is the discontinuous (or internal) phase. In a W/O emulsion (or invert emulsion), the aqueous phase is the discontinuous phase and the oleaginous phase is the continuous phase. Generally, the emulsified treatment fluids of the present invention are suitable for use in a variety of subterranean treatments where an O/W emulsion or a W/O emulsion is suitable.

The oleaginous phase of the emulsified treatment fluids of the present invention may comprise any oleaginous fluid suitable for use in emulsions used in subterranean treatments. The oleaginous fluid may be from natural or synthetic sources. Examples of suitable oleaginous fluids include, but are not limited to, α-olefins, internal olefins, alkanes, aromatic solvents, cycloalkanes, liquefied petroleum gas, kerosene, diesel oils, crude oils, gas oils, fuel oils, paraffin oils, mineral oils, low-toxicity mineral oils, olefins, esters, amides, synthetic oils (e.g., polyolefins), polydiorganosiloxanes, siloxanes, organosiloxanes, ethers, acetals, dialkylcarbonates, hydrocarbons, and combinations thereof.

For the emulsifying embodiments, the aqueous phase may comprise an aqueous fluid. Suitable aqueous fluids may include, but are not limited to, freshwater, seawater, saltwater (e.g., saturated or unsaturated), and brines (e.g., saturated saltwater). The aqueous fluid may be from any source, provided that it does not adversely affect the stability of the emulsified treatment fluids of the present invention.

Because the emulsifying agents comprising the degradable surfactants act to stabilize the emulsified treatment fluids of the present invention, the emulsified treatment fluids should have a delayed break, due to the degradation of the surfactants therein, without the need for the inclusion of conventional emulsion breakers (e.g., acid or base precursors). Separation of the two phases of the emulsion is generally referred to as "breaking" the emulsion. However, in some embodiments, an enzyme breaker (e.g., Lipase, alphas and beta amylases, invertase, maltase, cellulase, hemicellulase, and the like) or any other suitable breaker may be used to facilitate the degradation of the degradable surfactants (by degradation of the degradable hydrophobic portion or the cleavage of the hydrophobic chain from the hydrophilic polymeric block) and thus the breaking of the emulsified treatment fluids of the present invention. Depending on the particular application, the enzyme breaker may be included in the emulsified treatment fluids of the present invention or the emulsified treatment fluid may be contacted by the enzyme breaker subsequent to introduction into the well bore.

Depending on the particular application, the emulsified treatment fluids of the present invention may further comprise any of a variety of additional additives. Examples of suitable additives include, but are not limited to, proppant particulates, gravel particulates, weighting agents, organophilic clays, bridging agents, fluid loss control agents, wetting agents, combinations thereof, and the like. Individuals skilled in the art, with the benefit of this disclosure, will recognize the types of additives to include for a particular application.

The emulsified treatment fluids of the present invention may be used in any suitable subterranean treatment where an emulsion may be used, including, but not limited to, drilling operations (e.g., as a drilling fluid or a drill-in fluid), fracturing treatment (e.g., as a fracturing fluid), well bore cleanups, viscous sweeps, and sand control treatments (e.g., as a gravel packing fluid). An example method of the present invention of treating a subterranean formation comprises: providing an emulsified treatment fluid of the present invention that comprises a degradable surfactant, an oleaginous phase, and an aqueous phase; and introducing the emulsified treatment fluid into a well bore that penetrates the subterranean formation.

For the foaming embodiments, the treatment fluids of the present invention may be a foamed treatment fluid, the foamed treatment fluid comprising an aqueous fluid, a gas, and a foaming additive that comprises a degradable surfactant. Suitable aqueous fluids may include, but are not limited to, freshwater, seawater, saltwater (e.g., saturated or unsaturated), and brines (e.g., saturated saltwater). The aqueous fluid may be from any source, provided that it does not adversely affect the stability of the foamed treatment fluids of the present invention.

The gas included in the treatment fluids of the present invention may be any gas suitable for foaming a treatment fluid, including, but not limited to, nitrogen, carbon dioxide, and air, and derivatives thereof and combinations thereof. Generally, the gas should be present in the foamed treatment fluids of the present invention in an amount sufficient to form a foam. In certain embodiments, the gas may be present in the foamed treatment fluids of the present invention in an amount in the range of from about 5% to about 95% by volume of the foamed treatment fluid, exclusive of the volume of the gas.

As will be recognized by those of ordinary skill in the art, with the benefit of this disclosure, a wide variety of additional additives may be included in the foamed treatment fluids of the present invention. Examples of suitable additives include, but are not limited to, gelling agents, gel breakers, proppant particulates, gravel particulates, defoaming agents, clay stabilizers, scale inhibitors, fluid loss control additives, and combinations thereof.

The foamed treatment fluids of the present invention may be used in any suitable subterranean treatment where a foamed treatment fluid emulsion may be used, including, but not limited to, drilling operations (e.g., as a drilling fluid or a drill-in fluid), fracturing treatment (e.g., as a fracturing fluid), well bore cleanups, and sand control treatments (e.g., as a gravel packing fluid). An example method of the present invention of treating a subterranean formation comprises: providing a foamed treatment fluid of the present invention that comprises an aqueous fluid, a gas, and a foaming agent that comprises a degradable surfactant; and introducing the foamed treatment fluid into a well bore that penetrates the subterranean formation.

An embodiment of the present invention provides a method of treating a subterranean formation. In an example of such a method, the method may comprise providing a treatment fluid comprising an aqueous fluid, and a degradable surfactant derived from a degradable polymer; and introducing the treatment fluid into a well bore that penetrates the subterranean formation. In certain embodiments, the treatment fluid may be introduced into the well bore at a pressure sufficient to create or enhance at least one fracture in the subterranean formation.

Another embodiment of the present invention provides a method of treating a subterranean formation. In an example of such a method, the method may comprise providing an emulsified treatment fluid comprising an oleaginous phase, an aqueous phase, and an emulsifying agent comprising a degradable surfactant derived from a degradable polymer; and introducing the emulsified treatment fluid into a well bore that penetrates the subterranean formation.

Another embodiment, the present invention provides a method of treating a subterranean formation. In an example of such a method, the method may comprise providing a foamed treatment fluid comprising an aqueous fluid, a gas, and a foaming agent comprising a degradable surfactant derived from a degradable polymer; and introducing the emulsified treatment fluid into a well bore that penetrates the subterranean formation.

To facilitate a better understanding of the present invention, the following examples of certain aspects of some embodiments are given. In no way should the following examples be read to limit, or define, the scope of the invention.

EXAMPLES

Example 1

Samples of degradable block copolymer surfactants comprising a hydrophilic A block and a hydrophobic degradable polymeric B block were synthesized using known literature procedures.

Polymerization of a monomethoxypolyethylene glycol-poly(lactide) (mPEG-PLA) block copolymer (A-B type) was performed according to the following procedure. Poly(ethylene glycol)methyl ether (Mn: 5,000 Daltons) in an amount of 10 grams was introduced into a flame-dried 100 ml two-neck round-bottomed flask, and dehydrated by heating in an oil bath to 130° C. under reduced pressure (1 ml Hg) for 2 hours. The reaction flask was filled with argon and crystallized lactide (10.08 g, 0.07 mol) was added to the flask. The mixture was stirred for 30 minutes with a magnetic stirrer. To this mixture was injected stannous octoate (0.28 g, 0.7 mmol) in 0.3 ml of dry toluene. The mixture was stirred for 10 minutes, and a vacuum was applied to remove the toluene. After the toluene's removal, the mixture was heated under argon at 130° C. for 16 hours. The polymer formed upon cooling was dissolved in dichloromethane (125 ml) and ether was added to precipitate the polymer. The precipitate obtained was filtered and dried in a vacuum oven for 48 hours to afford 18 grams of Copolymer No. 1. The mPEG-PLA copolymer obtained had a number average molecular weight of 5,000-5,000 Daltons.

Additional samples of MPEG-PLA copolymers were prepared utilizing the above procedures. To obtain samples with varying molecular weights and block length of the hydrophobe, the mole ratio of crystallized lactide to the monomethoxypolyethylene glycol were varied to control the length of the hydrophobic (B block) so as to provide a series of polymers. Accordingly, Copolymer No. 2 was a MPEG-PLA block copolymer having a number average molecular weight of 5,000-3,000 Daltons. Copolymer No. 3 was a mPEG-PLA block copolymer having a number average molecular weight of 5,000-1,500 Daltons. Copolymer No. 4 was a MPEG-PLA block copolymer having a number average molecular weight of 350-2,000 Daltons. And Copolymer No. 5 was a mPEG-PLA block copolymer having a number average molecular weight of 5,000-15,000 Daltons.

Additionally, polymerization of a monomethoxypolyethylene glycol-poly(ε-caprolactone) (mPEG-PCL) block copolymer (A-B type) also was performed according to the above procedure. However, instead of lactide, ε-caprolactone was used. Accordingly, Copolymer No. 6 was a mPEG-PCL copolymer having a number average molecular weight of 350-1,500 Daltons. And Copolymer No. 7 was a mPEG-PCL copolymer having a number average molecular weight of 350-1,500 Daltons.

The samples that were synthesized according to the above procedures are shown below in Table 1.

TABLE 1

| Sample | Block Copolymer | Mn (Daltons) |
| --- | --- | --- |
| Copolymer No. 1 | mPEG-PLA | 5,000–5,000 |
| Copolymer No. 2 | mPEG-PLA | 5000–3,000 |
| Copolymer No. 3 | mPEG-PLA | 5000–1,500 |
| Copolymer No. 4 | mPEG-PLA | 350–2,000 |

TABLE 1-continued

| Sample | Block Copolymer | Mn (Daltons) |
| --- | --- | --- |
| Copolymer No. 5 | mPEG-PLA | 2,000–5,000 |
| Copolymer No. 6 | mPEG-PCL | 350–1,500 |
| Copolymer No. 7 | mPEG-PCL | 350–2,500 |

Example 2

Emulsions were prepared utilizing the sample copolymers that were prepared in Example 1. Copolymer No. 1 in an amount of 2 grams was dissolved in 25 ml of water. To this solution, 96 ml of dodecane was added and the resulting solution was stirred with a mixer (Silverson L4RT-W) for about 1 minute. An O/W emulsion was observed to have formed that stuck to the propeller of the mixer. After mixing, to test the emulsion, it was dropped into a beaker that contained water and dodecane, as separate phases. The gel dispersed in the water but not in the dodecane, confirming an O/W emulsion. Furthermore, this emulsion was stable at room temperature for multiple days. The emulsion was heated to 80° C. After four hours at this temperature, a portion of the dodecane separated and complete separation of the two phases was observed after 24 hours. According to the above procedure, O/W emulsions were also formed utilizing 1 gram of Copolymer Nos. 2 and 3, respectively.

W/O emulsions were also prepared utilizing Copolymer No. 6 that was prepared in Example 1. Copolymer No. 6 in an amount of 1 gram was dissolved in a 10 ml mixture that comprises toulene and dodecane in a 1:1 ratio by weight. To this solution, 30 ml of water was added, and the resulting solution was stirred with the mixer for about 1 minute to form a W/O emulsion.

Therefore, Example 2 indicates that degradable surfactants useful in the present invention comprising a block copolymer comprising a hydrophobic degradable polymeric block and a hydrophilic polymeric block may be used to form stable emulsions.

Example 3

Foams were prepared utilizing the copolymers that were prepared in Example 1. Copolymer No. 1 in an amount of 1.8 grams was dissolved in 800 grams of water. The resulting solution was stirred in a foam blender for 2 minutes to form a foam. The foamed solution was poured into a beaker and allowed to settle. The foam completely disappeared in 2 hours. To determine tolerance to calcium ions, 2 grams of calcium chloride was then added to the sample. After the addition of the calcium chloride, the solution was stirred in the foam blender for two minutes. The solution containing calcium chloride foamed. Foams were also prepared using Copolymers Nos. 2, 3, 5, and 6.

Accordingly, Example 3 indicates that degradable surfactants useful in the present invention comprising a block copolymer comprising a hydrophobic degradable polymeric block and a hydrophilic polymeric block may be used to form foams.

Example 4

The following example was performed to determine the water drainage from a foam prepared using Copolymer No. 2 that was prepared in Example 1. For this example, Copolymer No. 2 in an amount of 1 gram was dissolved in 500 ml of water. The resulting solution was stirred in a jar at 12,000 rpm to form a foam. The resulting foam was then transferred to a 1-liter graduated cylinder, and the drainage of water at the bottom of the graduated cylinder was measured for a period of 10 minutes. The above procedure was repeated utilizing PLURONIC® F108, an ethylene oxide-propylene oxide-ethylene oxide block copolymer that is commercially available from BASF Corporation, Florham Park, N.J. The results of Example 4 are shown below in Table 2.

TABLE 2

| Time (min) | Water Drainage (ml): Copolymer No. 2 Foam | Water Drainage (ml): PLURONIC ® F108 Foam |
|---|---|---|
| 1 | 80 | 50 |
| 2 | 150 | 120 |
| 3 | 250 | 170 |
| 4 | 380 | 320 |
| 5 | 400 | 345 |
| 6 | 410 | 360 |
| 7 | 422 | 375 |
| 8 | 430 | 385 |
| 9 | 438 | 395 |
| 10 | 445 | 402 |

Accordingly, Example 4 indicates that degradable surfactants useful in the present invention comprising a block copolymer comprising a hydrophobic degradable polymeric block and a hydrophilic polymeric block may be used to form foams.

Therefore, the present invention is well adapted to attain the ends and advantages mentioned as well as those that are inherent therein. While numerous changes may be made by those skilled in the art, such changes are encompassed within the spirit of this invention as defined by the appended claims. The terms in the claims have their plain, ordinary meaning unless otherwise explicitly and clearly defined by the patentee.

What is claimed is:

1. A method of treating a subterranean formation, comprising:
    providing a treatment fluid comprising an aqueous fluid and a degradable surfactant derived from a degradable polymer, wherein the degradable surfactant is not a phosphate ester and wherein the degradable surfactant has a hydrophilic/lipophilic balance that facilitates the formation of an emulsion; and
    introducing the treatment fluid into a well bore that penetrates the subterranean formation.

2. The method of claim 1 wherein the degradable surfactant comprises a degradable block copolymer surfactant that comprises a hydrophilic polymeric block and a hydrophobic degradable polymeric block.

3. The method of claim 2 wherein the degradable block copolymer surfactant comprises a hydrophilic polymeric backbone grafted with a polylactic acid or a poly(caprolactone).

4. The method of claim 3 wherein the hydrophilic polymeric block comprises guar.

5. The method of claim 2 wherein the degradable block copolymer surfactant comprises a block copolymer of a poly(alkylene glycol) or a poly(alkylene oxide), and an aliphatic polyester.

6. The method of claim 2 wherein the degradable block copolymer surfactant comprises a quaternary ammonium degradable block copolymer salt.

7. The method of claim 1 wherein the degradable surfactant comprises a degradable polymeric surfactant that comprises an aliphatic polyester tail and a hydrophilic head group.

8. The method of claim 7 wherein the degradable polymeric surfactant is formed from a reaction that comprises at least one of the following: a poly(anhydride); a poly(orthoester); a poly(lactic acid); a poly(glycolic acid); a poly(caprolactone); a poly(hydroxybutyrate); a polyphosphazine; a poly(carbonate); a polyacetal; a polyetherester; a polyesteramide; a polycyanoacrylate; a polyurethane; a polyacrylate; or a copolymer thereof.

9. The method of claim 7 wherein the degradable polymeric surfactant comprises a quaternary amine cationic surfactant.

10. The method of claim 7 wherein the hydrophilic head group is an anionic group, a cationic group, an amphoteric group, a Zwifferionic group, or a non-ionic group.

11. The method of claim 7 wherein the degradable polymeric surfactant comprises poly(lactic) acid or poly(caprolactone) with a head group that comprises a salt of a carboxylic acid.

12. The method of claim 7 wherein at least a portion of the degradable polymeric surfactant has the following formula:

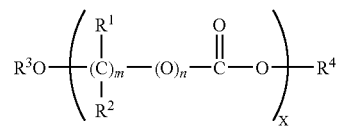

wherein $R^1$ is a hydrogen, an alkyl, an aryl, an alkylaryl, an acetyl, or a heteroatom; $R^2$ is a hydrogen, an alkyl, an aryl, an alkylaryl, an acetyl, or a heteroatom, $R^3$ is a hydrogen, an alkyl, an aryl, an alkylaryl, an acetyl, an alkoxyl, a benzoyl, a heteroatom or a group comprising an anionic group, a cationic group, or a non-ionic group; $R^4$ is a H, a Na, a K, or a Li, or a group comprising an anionic group, a cationic group, or a non-ionic group; n is 0 or 1; m is an integer between 1 and 20; and X is an integer between 10 and 10,000.

13. The method of claim 1 wherein the treatment fluid is introduced into the well bore at a pressure sufficient to create or enhance at least one fracture in the subterranean formation.

14. The method of claim 1 wherein the hydrophilic/lipophilic balance is from about 3 to about 6 or from about 8 to about 18.

15. The method of claim 1 wherein the degradable surfactant comprises a degradable hydrophobic block attached to a hydrophilic polymeric block, the degradable hydrophobic block comprising at least one compound selected from the group consisting of: a poly(anhydride); a poly(orthoester); a poly(lactic acid); a poly(glycolic acid); a poly(caprolactone); a poly(hydroxybutyrate); a polyphosphazine; a poly(carbonate); a polyacetal; a polyetherester; a polyesteramide; a polycyanoacrylate; a polyurethane; a polyacrylate; and a copolymer thereof, the hydrophilic polymeric block comprising at least one compound selected from the group consisting of: a poly(alkylene glycol); a poly(alcohol); poly(vinyl pyrrolidone); a polysaccharide; a chitin; a chitosan; a protein; a poly(amino acid); a poly(alkylene oxide); a poly(amide); a poly(acid); a polyol; and a copolymer thereof.

16. A method of treating a subterranean formation penetrated by a well bore comprising:
    providing an emulsified treatment fluid comprising an oleaginous phase, an aqueous phase, and an emulsifying agent comprising a degradable surfactant derived from a degradable polymer, wherein the degradable surfactant is not a phosphate ester; and introducing the emulsified treatment fluid into the well bore.

17. The method of claim 16 wherein the degradable surfactant comprises a degradable block copolymer surfactant that comprises a hydrophilic polymeric block and a hydrophobic degradable polymeric block.

18. The method of claim 17 wherein the degradable block copolymer surfactant comprises a block copolymer of a poly(alkylene glycol) or a poly(alkylene oxide), and an aliphatic polyester.

19. The method of claim 16 wherein the degradable surfactant has a hydrophilic/lipophilic balance of from about 3 to about 6 or from about 8 to about 18.

20. The method of claim 16 wherein the degradable surfactant comprises a degradable hydrophobic block attached to a hydrophilic polymeric block, the degradable hydrophobic block comprising at least one compound selected from the group consisting of: a poly(anhydride); a poly(orthoester); a poly(lactic acid); a poly(glycolic acid); a poly(caprolactone); a poly(hydroxybutyrate); a polyphosphazine; a poly(carbonate); a polyacetal; a polyetherester; a polyesteramide; a polycyanoacrylate; a polyurethane; a polyacrylate; and a copolymer thereof, the hydrophilic polymeric block comprising at least one compound selected from the group consisting of: a poly(alkylene glycol); a poly(alcohol); poly(vinyl pyrrolidone); a polysaccharide; a chitin; a chitosan; a protein; a poly(amino acid); a poly(alkylene oxide); a poly(amide); a poly(acid); a polyol; and a copolymer thereof.

21. A method of treating a subterranean formation penetrated by a well bore comprising:

providing a foamed treatment fluid comprising an aqueous fluid, a gas, and a foaming agent comprising a degradable surfactant derived from a degradable polymer, wherein the degradable surfactant is not a phosphate ester and wherein the degradable surfactant has a hydrophilic/lipophilic balance that facilitates the formation of an emulsion; and introducing the foamed treatment fluid into the well bore.

22. The method of claim 21 wherein the degradable surfactant comprises a degradable block copolymer surfactant that comprises a hydrophilic polymeric block and a hydrophobic degradable polymeric block.

23. The method of claim 22 wherein the degradable block copolymer surfactant comprises a block copolymer of a poly(alkylene glycol) or a poly(alkylene oxide), and an aliphatic polyester.

24. The method of claim 21 wherein the hydrophilic/lipophilic balance is from about 3 to about 6 or from about 8 to about 18.

25. The method of claim 21 wherein the degradable surfactant comprises a degradable hydrophobic block attached to a hydrophilic polymeric block, the degradable hydrophobic block comprising at least one compound selected from the group consisting of: a poly(anhydride); a poly(orthoester); a poly(lactic acid); a poly(glycolic acid); a poly(caprolactone); a poly(hydroxybutyrate); a polyphosphazine; a poly(carbonate); a polyacetal; a polyetherester; a polyesteramide; a polycyanoacrylate; a polyurethane; a polyacrylate; and a copolymer thereof, the hydrophilic polymeric block comprising at least one compound selected from the group consisting of: a poly(alkylene glycol); a poly(alcohol); poly(vinyl pyrrolidone); a polysaccharide; a chitin; a chitosan; a protein; a poly(amino acid); a poly(alkylene oxide); a poly(amide); a poly(acid); a polyol; and a copolymer thereof.

* * * * *

UNITED STATES PATENT AND TRADEMARK OFFICE
CERTIFICATE OF CORRECTION

PATENT NO. : 7,608,567 B2  Page 1 of 1
APPLICATION NO. : 11/127583
DATED : October 27, 2009
INVENTOR(S) : Rajesh K. Saini It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 779 days.

Signed and Sealed this

Twelfth Day of October, 2010

David J. Kappos
*Director of the United States Patent and Trademark Office*